(12) United States Patent
Chalfin et al.

(10) Patent No.: US 11,819,803 B2
(45) Date of Patent: Nov. 21, 2023

(54) SYSTEMS AND METHODS FOR QUANTIFYING AND/OR VERIFYING OCEAN-BASED INTERVENTIONS FOR SEQUESTERING CARBON DIOXIDE

(71) Applicant: Running Tide Technologies, Inc., Portland, ME (US)

(72) Inventors: Max Chalfin, New York, NY (US); Margaux Martin-Filippi, Lone Tree, CO (US); Andrew Thompson, Biddeford, ME (US); Justin Baker Ries, Swampscott, MA (US)

(73) Assignee: Running Tide Technologies, Inc., Portland, ME (US)

( * ) Notice: Subject to any disclaimer, the term of this patent is extended or adjusted under 35 U.S.C. 154(b) by 0 days.

(21) Appl. No.: 17/957,681

(22) Filed: Sep. 30, 2022

(65) Prior Publication Data

US 2023/0106744 A1    Apr. 6, 2023

Related U.S. Application Data

(60) Provisional application No. 63/251,321, filed on Oct. 1, 2021.

(51) Int. Cl.
*B01D 53/62* (2006.01)
*A01G 33/00* (2006.01)

(52) U.S. Cl.
CPC .............. *B01D 53/62* (2013.01); *A01G 33/00* (2013.01)

(58) Field of Classification Search
CPC ................ B01D 53/62; B01D 2251/95; B01D 2257/504; B01D 53/84; B01D 53/85;
(Continued)

(56) References Cited

U.S. PATENT DOCUMENTS 4,051,810 A    10/1977  Breit
4,133,141 A     1/1979  Lee
(Continued)

FOREIGN PATENT DOCUMENTS

CA    2804792 A1    1/2012
CN    1208552 A     2/1999
(Continued)

OTHER PUBLICATIONS

Duarte, C. M. et al., "Can Seaweed Farming Play a Role in Climate Change Mitigation and Adaptation?" Frontiers in Marine Science, vol. 4, Article 100 (Apr. 2017), 8 pages, Retrieved from the Internet: https://doi.org/10.3389/fmars.2017.00100.

(Continued)

*Primary Examiner* — Timothy C Vanoy
(74) *Attorney, Agent, or Firm* — Cooley LLP

(57) ABSTRACT

A method for calculating carbon credits includes obtaining sensor data associated with at least a portion of a deployment for cultivating a target product in a body of water, executing at least one model based at least in part on the sensor data to generate an output predicting at least one characteristic associated with the target product, the deployment, or a portion of the body of water, and inputting the output into a quantification model. The quantification model is executed to generate an output associated with a predicted capacity of the target product to sequester carbon dioxide. An accuracy of the predicted capacity resulting from the output of the quantification model is greater than an accuracy of a predicted or inferred capacity resulting from the output of each model individually. Carbon dioxide offset credits are determined based on the predicted capacity resulting from the output of the quantification model.

30 Claims, 8 Drawing Sheets

(58) Field of Classification Search
CPC .......... A01G 33/00; Y02C 20/40; G05D 1/00; G05D 21/00; G06N 3/00; G06N 7/00; C02F 2209/24
See application file for complete search history.

(56) References Cited

U.S. PATENT DOCUMENTS

| | | | |
|---|---|---|---|
| 4,235,043 | A | 11/1980 | Harasawa et al. |
| 4,395,970 | A | 8/1983 | Kunkle et al. |
| 5,309,672 | A | 5/1994 | Spencer et al. |
| 5,846,423 | A | 12/1998 | Jensen |
| 6,056,919 | A | 5/2000 | Markels, Jr. |
| 6,062,170 | A | 5/2000 | Finch et al. |
| 6,230,646 | B1 | 5/2001 | Berry et al. |
| 6,244,218 | B1 | 6/2001 | McNeil |
| 6,343,567 | B1 | 2/2002 | McNeil et al. |
| 6,539,894 | B1 | 4/2003 | Byrne et al. |
| 6,892,672 | B2 | 5/2005 | Klein |
| 7,690,247 | B1 | 4/2010 | David |
| 7,722,842 | B2 | 5/2010 | Park et al. |
| 7,836,633 | B2 | 11/2010 | Wilcox |
| 7,905,055 | B2 | 3/2011 | Wilcox |
| 8,114,374 | B2 | 2/2012 | Blencoe et al. |
| 11,382,315 | B2 | 7/2022 | Merrill et al. |
| 2002/0162515 | A1 | 11/2002 | Boyd |
| 2004/0158478 | A1 | 8/2004 | Zimmerman |
| 2006/0162667 | A1 | 7/2006 | Papadoyianis et al. |
| 2007/0209278 | A1 | 9/2007 | Becker |
| 2009/0118859 | A1 | 5/2009 | Whaley et al. |
| 2009/0151240 | A1 | 6/2009 | Kayama et al. |
| 2009/0210295 | A1 | 8/2009 | Edholm et al. |
| 2010/0154298 | A1 | 6/2010 | Albus et al. |
| 2011/0289840 | A1 | 12/2011 | Bakken |
| 2012/0011050 | A1 | 1/2012 | Lambert |
| 2012/0199078 | A1 | 8/2012 | Krone |
| 2015/0020445 | A1 | 1/2015 | Grajcar |
| 2015/0173317 | A1 | 6/2015 | Ordway et al. |
| 2015/0196002 | A1 | 7/2015 | Friesth |
| 2016/0029579 | A1 | 2/2016 | Carscallen et al. |
| 2016/0121009 | A1 | 5/2016 | Farr et al. |
| 2016/0319395 | A1 | 11/2016 | Bu et al. |
| 2018/0116139 | A1 | 5/2018 | Karta |
| 2018/0170486 | A1 | 6/2018 | Sinclair et al. |
| 2019/0141925 | A1 | 5/2019 | Le Berre |
| 2019/0377946 | A1 | 12/2019 | Genty et al. |
| 2020/0338497 | A1 | 10/2020 | McDaniel |
| 2021/0112786 | A1 | 4/2021 | Fries et al. |
| 2021/0177998 | A1 | 6/2021 | Brown et al. |
| 2021/0267214 | A1 | 9/2021 | Farmer et al. |
| 2021/0345589 | A1 | 11/2021 | Merrill et al. |
| 2022/0295761 | A1 | 9/2022 | Merrill et al. |
| 2023/0152292 | A1 | 5/2023 | Mastrangelo et al. |

FOREIGN PATENT DOCUMENTS

| | | | |
|---|---|---|---|
| CN | 204168860 U | 2/2015 | |
| CN | 204350803 U | 5/2015 | |
| CN | 204350804 U | 5/2015 | |
| CN | 204350809 U | 5/2015 | |
| CN | 204350864 U | 5/2015 | |
| CN | 204634737 U | 9/2015 | |
| CN | 204634741 U | 9/2015 | |
| CN | 104996327 A | 10/2015 | |
| CN | 104996347 A | 10/2015 | |
| CN | 105028250 A | 11/2015 | |
| CN | 104082120 B | 1/2016 | |
| CN | 108147544 A | 6/2018 | |
| JP | H0965795 A | 3/1997 | |
| JP | 2002119161 A | 4/2002 | |
| JP | 2005348696 A | 12/2005 | |
| JP | 2006288207 A | 10/2006 | |
| JP | 2008061509 A | 3/2008 | |
| JP | 2008148575 A | 7/2008 | |
| RU | 126327 U1 | 3/2013 | |
| WO | WO-2006030042 A1 | 3/2006 | |
| WO | WO 2013 120 024 A1 * | 8/2013 | ............ B01D 53/62 |
| WO | WO-2014138982 A1 | 9/2014 | |
| WO | WO-2016162774 A1 | 10/2016 | |
| WO | WO 2017 038 397 A1 * | 3/2017 | ............ B01D 53/04 |
| WO | WO-2018115339 A1 | 6/2018 | |
| WO | WO-2019140462 A1 | 7/2019 | |
| WO | WO-2021231471 A1 | 11/2021 | |
| WO | WO-2021255714 A1 | 12/2021 | |
| WO | WO-2022081826 A1 | 4/2022 | |
| WO | WO-2023056459 A1 | 4/2023 | |
| WO | WO-2023086957 A1 | 5/2023 | |

OTHER PUBLICATIONS

Goodwin, B., GigaFarm Project Specification Document, 5273_Kombu, Phase 1.0, (Date Unknown), 12 pages.
International Search Report and Written Opinion for International Application No. PCT/US2021/031833, dated Aug. 11, 2021, 13 pages.
International Search Report and Written Opinion for International Application No. PCT/US2021/054952, dated Jan. 19, 2022, 15 pages.
Krause-Jensen, D. et al., "Substantial role of macroalgae in marine carbon sequestration," Nature Geoscience, vol. 9, Issue 10, pp. 737-742 (Oct. 2016); published online Sep. 2016. https://doi.org/10.1038/ngeo2790.
Mooney-McAuley, K. M. et al., "Best Practice Guidelines for Seaweed Cultivation and Analysis," Report WP1A5.01, Energetic Algae ("EnAlgae"), Jun. 2016, 38 pages.
Office Action for U.S. Appl. No. 17/342,143 dated Nov. 24, 2021, 22 pages.
Peeples, T., "An inside look into blue evolution's seaweed hatchery," [Online], Blue Evolution, 2019, 5 pages, Retrieved from the Internet: URL: https://www.blueevolution.com/recipesblog/inside-look-seaweed-hatchery.
Redmond, S. et al., "Aquaculture in Shared Waters Kelp Aquaculture," Island Institute, Apr. 2015, 4 pages.
Stanford Environmental Health & Safety, "Information on Alkali Metals," [Online], Retrieved from the Internet: https://ehs.stanford.edu/reference/information-alkali-metals, Retrieved on Feb. 9, 2022, 4 pages.
Uykun, C., "Above-Ground Biomass and Carbon Estimations and Recommendations for Forests in Turkey," Michigan Technological University, Dissertations, Master's Theses and Master's Reports, 2018, 57 pages.
Walker, T., "Kelp farming in Alaska traces roots to hatcheries," [Online], Hatchery International, Oct. 2019, 5 pages, Retrieved from the Internet: URL: https://www.hatcheryinternational.com/kelp-farming-success-in-alaska-traces-roots-to-hatcheries/.
Final Rejection Office Action for U.S. Appl. No. 17/834,457 dated Feb. 8, 2023, 23 pages.
International Preliminary Report on Patentability for International Application No. PCT/US2021/054952 dated Apr. 27, 2023, 8 pages.
International Search Report and Written Opinion for International Application No. PCT/US2022/077404 dated Dec. 12, 2022, 23 pages.
International Search Report and Written Opinion for International Application No. PCT/US2022/079746 dated Mar. 21, 2023, 15 Pages.
International Search Report and Written Opinion for International Application No. PCT/US2023/061782, dated Jun. 13, 2023, 13 pages.
Non-Final Office Action for U.S. Appl. No. 18/156,614, dated Jun. 21, 2023, 19 pages.

* cited by examiner

SYSTEMS AND METHODS FOR QUANTIFYING AND/OR VERIFYING OCEAN-BASED INTERVENTIONS FOR SEQUESTERING CARBON DIOXIDE

CROSS-REFERENCE TO RELATED APPLICATIONS

This application claims priority to and the benefit of U.S. Provisional Patent Application Ser. No. 63/251,321, filed Oct. 1, 2021, entitled, "Systems and Methods for Quantifying and/or Verifying Target Product Accumulation for Greenhouse Gas Sequestration," the disclosure of which is incorporated herein by reference in its entirety.

BACKGROUND

The present disclosure relates generally to carbon sequestration, and more particularly, to systems and methods for quantifying and/or verifying ocean-based interventions for sequestering carbon dioxide.

Human activity has increased atmospheric carbon dioxide ($CO_2$) by approximately 50% (from about 280 to about 420 ppm) over the past 200-300 years due to the combustion of fossil fuels, land use changes, and other industrial processes. These anthropogenic increases in atmospheric $CO_2$ are causing a variety of environmental and societal problems, including global warming, increased wildfires, increased droughts, increased severity and frequency of storms, sea level rise, melting glaciers, and ocean acidification.

The global carbon cycle operates through a variety of response and feedback mechanisms between the Earth's primary carbon reservoirs, namely the marine and terrestrial biospheres, the atmosphere, the ocean, and sediments/rocks. With respect to atmospheric carbon dioxide, the carbon cycle can be broken down into two distinct, but overlapping, components: the fast carbon cycle and the slow carbon cycle. The fast carbon cycle encompasses the movement of carbon via photosynthesis and respiration, as well as the continuous exchange of $CO_2$ amongst the biosphere, atmosphere, and ocean. The fast carbon cycle is dynamic and volatile, and it can be best understood as the flow of carbon through living ecosystems. In contrast, the slow carbon cycle consists of the movement of carbon via gravity, pressure, chemical weathering, ocean currents, etc. These processes move carbon from living ecosystems into geological and deep ocean reservoirs such as sediments, mineral deposits (e.g., oil, gas, coal), and deep waters. Slow carbon cycle reservoirs evolve very slowly.

One of the greatest challenges facing humanity in the 21st century is to develop scalable methods for removing $CO_2$ from the atmosphere and upper ocean (e.g., $CO_2$ in the fast carbon cycle) and durably sequestering it in, for example, deep ocean, marine sediments, geological deposits, and/or the like (e.g., in or by the slow carbon cycle) in order to limit the environmental and socio-economic damage that is associated with increasing $CO_2$ in the atmosphere and upper ocean. Without human interference, carbon moves from the slow to the fast cycle over millions of years through volcanic activity, driven by the subduction and melting of limestones and oil and gas-bearing rocks, and over intermediate timescales through ocean upwelling, and carbon cycling between the atmosphere, ocean, biosphere, and geologic reservoirs, in both the fast and slow carbon cycles, is generally balanced in a manner that promotes stable climates, ocean chemistry, and ecosystems. These geologic timelines, however, are much too slow to address the challenges we face today due to anthropogenic increases in atmospheric $CO_2$.

In an attempt to abate $CO_2$ emissions (and/or other greenhouse gas emissions), governments and regulatory authorities have established greenhouse gas emissions caps and have allowed organizations to comply with the emissions caps by purchasing, for example, carbon credits and/or offsets. Carbon credits can be bought and sold as amounts of carbon sequestered using carbon sequestration technology. Companies that achieve preset carbon offsets (e.g., becoming "carbon neutral") are often rewarded with financial incentives and/or tax benefits, which can be used to subsidize future projects for the reduction of greenhouse gas emissions.

Ocean-based interventions such as cultivating marine mass and sinking it to the ocean floor have shown promise as carbon sequestration technologies. Predicting the growth of marine species and/or its capacity to sequester carbon dioxide can, for example, enable the capacity to be bought and/or sold as carbon credits in a suitable market such as commodities market, futures market etc. Therefore, it can be advantageous to predict the growth of marine species and/or its capacity to sequester carbon dioxide. Existing methodologies to assess and/or predict the growth of marine species rely on human observation and are often imprecise, inaccurate, labor intensive, and/or impracticable for large scale deployments. Existing methodologies for assessing and/or predicting a result of other ocean-based interventions for sequestering carbon dioxide face similar challenges and/or uncertainties.

Accordingly, a need exists for improved systems and methods for quantifying and/or verifying ocean-based interventions for sequestering carbon dioxide.

SUMMARY

Systems and methods for quantifying and/or verifying ocean-based interventions for sequestering carbon dioxide. In some embodiments, a method can include obtaining sensor data associated with at least a portion of a deployment for cultivating a target product in a body of water, executing at least one model based on the sensor data to generate an output predicting at least one characteristic associated with the target product, the deployment, and/or a portion of the body of water, and inputting the output into a quantification model. The quantification model is executed to generate an output associated with a predicted capacity of the target product to sequester carbon dioxide and a carbon dioxide offset credit is determined based on the predicted capacity resulting from output of the quantification model. An accuracy of the predicted capacity resulting from the output of the quantification model can be greater than an accuracy of a predicted capacity resulting from the output of each model individually.

In some embodiments, a method can include obtaining sensor data associated with a deployment for cultivating a target product in a body of water. The method can also include providing at least a portion of the sensor data as an input to at least one model from a number of models associated with the target product, the deployment, and/or a portion of the body of water in which the deployment is disposed. The models are executed in a predetermined sequence such that an output of a current model is an input for at least one subsequently executed model in the predetermined sequence. An output of a last model executed in the sequence is provided as input to a quantification model, which is executed to generate an output associated with a predicted capacity of the target product to sequester carbon dioxide.

In some embodiments, a method can include obtaining first sensor data from at least one sensor associated with at least one cultivation apparatus for cultivating a target product and second sensor data from at least one sensor associated with a deployment of any number of cultivation apparatus. The deployment being deployed in an ocean. The at least one cultivation apparatus being included in the plurality of cultivation apparatus. A first model is trained, based at least in part on the first sensor data, to generate a first output predicting at least one parameter associated with a growth of the target product of the at least one cultivation apparatus, and a second model is trained, based at least in part on the second sensor data, to generate a second output predicting a geographic dispersion of the deployment in the ocean. The method further includes training a third model, based at least in part on the first output and the second output, to generate a third output predicting an amount of accumulation of the target product of the deployment.

DETAILED DESCRIPTION

Figure 1A:
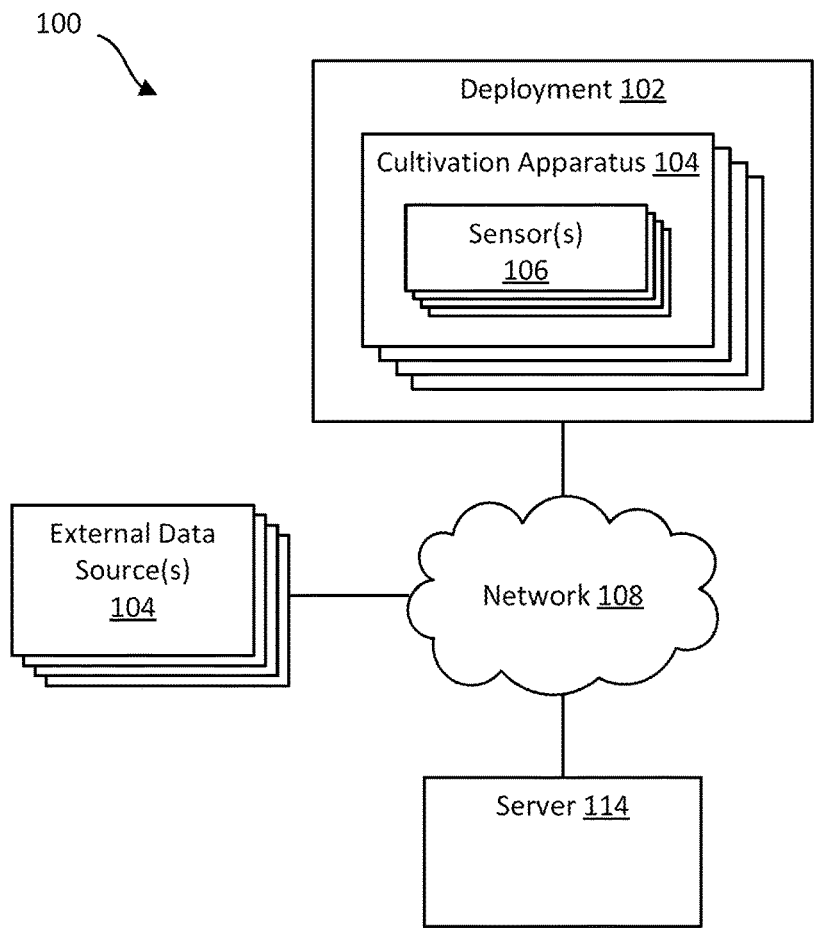
FIG. 1A is a schematic illustration of a system for quantifying target product accumulation, according to an embodiment.

Systems and methods for quantifying and/or verifying target product accumulation for greenhouse gas sequestration (e.g., carbon sequestration) is described herein. The target product, as described herein, includes and/or encompasses a wide variety of species. For example, a "target product" can include but is not limited to aquatic and/or marine species such as calcifying organisms, plankton, archaea filter feeders (e.g., oysters, clams, etc.), bacteria and other microorganisms, heterokonts like algae(s) (e.g., microalgae, macroalgae, etc.), and/or the like. In other implementations, however, a target product can refer to any suitable species whose cultivation leads to a desired result (e.g., as a harvested product, for bioremediation, for carbon capture and sequestration, and/or the like). In some implementations, the target products described herein can be cultivated and/or used for the purpose of bioremediation, eventual cultivation/harvesting, and/or for sequestering carbon dioxide. The target products may generally include negatively, neutrally, and/or positively buoyant species (e.g., species that sink, remain suspended, or float in water as they grow). Such target products may propagate or reproduce by producing gametophytes and/or sporophytes that can rapidly grow in a body of water and sequester atmospheric carbon via photosynthesis.

The target products described herein can be select marine species who's natural and/or desired habitat is a body of water. When referring to a body of water, it should be understood that the body of water can be selected based on characteristics that may facilitate the cultivation of the target product. Accordingly, though specific bodies of water may be referred to herein (e.g., an ocean or sea), it should be understood that the embodiment, example, and/or implementation so described is not limited to use in such an environment unless the context clearly states otherwise. Moreover, the term "saltwater" as used in this specification is intended to refer to any body of water the constituents of which include a certain concentration of salt(s). In contrast "freshwater" can refer to any body of water the constituents of which do not include or include limited concentrations of salt(s). Saltwater, for example, can refer to the water forming oceans, seas, bays, gulfs, as well as surface and/or subsurface brines, etc. Freshwater, for example, can refer to the water forming rivers, lakes, etc. Moreover, bodies of water described herein can also include certain mixtures of freshwater and saltwater (generally known as "brackish") such as, for example, the mixture of river water and sea water found in estuaries and/or the like.

Many marine target products (e.g., macroalgae) show promise as a carbon sequestration pathway as their wild growth currently contributes to naturally occurring carbon sequestration to the seafloor. Target product cultivation has the potential to improve this sequestration rate significantly due to increased cultivation productivity and sinking/sequestration rate relative to these naturally occurring phenomena. Target products can be cultivated in oceans, estuaries, lakes, rivers, and/or any other suitable body of water. These target products can be allowed to grow and accumulate biomass. Biomass may be corporeally retained or eroded (allowed to naturally break off and sink) into the water. Typically, after the accumulation reaches a certain threshold value, the target products are allowed to sink (or caused to sink) to the seafloor, thereby effectively sequestering the carbon dioxide associated with the accumulated target product.

Accordingly, carbon credits can be associated with the accumulation of the target product and/or capacity of the target product to sequester carbon. For instance, an amount of carbon that can be sequestered per unit of target product (e.g., that is sunk to the bottom of a body of water) can be calculated and/or predicted and sold in a carbon credit market (or any other suitable market) as a credit. In some instances, predicting growth, performance characteristics, and/or the capacity of the target product to sequester carbon can for example, enable the predicted capacity to be bought and/or sold as a commodity (e.g., in a commodities market, in a futures market, and/or in any other suitable market). Accordingly, accurately predicting target product accumulation and/or erosion can be useful to calculate carbon dioxide offset credits. Currently, however, there are no known existing systems and/or methods for predicting target product accumulation and/or erosion to the level of accuracy suitable for determining and/or predicting carbon credits associated with the sequestration of the target product. Direct measurement of target product accumulation and/or erosion through human observation can be infeasible and/or impracticable for large scale deployments. Therefore, the systems and methods disclosed herein can be used to characterize, quantify, and/or predict carbon dioxide offset credits with desired degree of accuracy.

In some instances, systems and/or methods can use and/or implement a combination of multiple models (e.g., machine learning models, probabilistic models, statistical models, stochastic models, a combination thereof, and/or the like) to determine carbon dioxide offset credits. For example, a quantification model can receive as input, sensor data that is associated with a deployment and/or a portion of a deployment (e.g., one or more cultivation apparatus as discussed below) for cultivating target product. The quantification model can also receive outputs from at least one model from the multiple models. Each of these models can predict, for example, one or more characteristics associated with the target product, one or more characteristics associated with the deployment and/or the portion of the deployment, one or more characteristics associated with an environment in which the deployment and/or the portion of the deployment is deployed, and/or any other suitable characteristic. Executing the quantification model can generate an output that can predict and/or that can be used to predict a capacity of the target product of the deployment to sequester carbon dioxide. In some instances, carbon dioxide offset credits can be calculated based on the predicted capacity of the target product to sequester carbon dioxide. Since the quantification model uses the outputs from multiple models, the quantification model can predict the capacity of the target product with a higher degree of accuracy than a prediction based on each individual model.

In some embodiments, a method can include obtaining sensor data associated with at least a portion of a deployment for cultivating a target product in a body of water, executing at least one model based on the sensor data to generate an output predicting at least one characteristic associated with the target product, the deployment, and/or a portion of the body of water, and inputting the output into a quantification model. The quantification model is executed to generate an output associated with a predicted capacity of the target product to sequester carbon dioxide and a carbon dioxide offset credit is determined based on the predicted capacity resulting from output of the quantification model. An accuracy of the predicted capacity resulting from the output of the quantification model can be greater than an accuracy of a predicted capacity resulting from the output of each model individually.

In some embodiments, a method can include obtaining sensor data associated with a deployment for cultivating a target product in a body of water. The method can also include providing at least a portion of the sensor data as an input to at least one model from a number of models associated with the target product, the deployment, and/or a portion of the body of water in which the deployment is disposed. The models are executed in a predetermined sequence such that an output of a current model is an input for at least one subsequently executed model in the predetermined sequence. An output of a last model executed in the sequence is provided as input to a quantification model, which is executed to generate an output associated with a predicted capacity of the target product to sequester carbon dioxide.

In some embodiments, a method can include obtaining first sensor data from at least one sensor associated with at least one cultivation apparatus for cultivating a target product and second sensor data from at least one sensor associated with a deployment of any number of cultivation apparatus. The deployment being deployed in an ocean. The at least one cultivation apparatus being included in the plurality of cultivation apparatus. A first model is trained, based at least in part on the first sensor data, to generate a first output predicting at least one parameter associated with a growth of the target product of the at least one cultivation apparatus, and a second model is trained, based at least in part on the second sensor data, to generate a second output predicting a geographic dispersion of the deployment in the ocean. The method further includes training a third model, based at least in part on the first output and the second output, to generate a third output predicting an amount of accumulation of the target product of the deployment.

The terminology used herein is for the purpose of describing particular embodiments only and is not intended to limit the full scope of the claims. Unless defined otherwise, all technical and scientific terms used herein have the same meanings as commonly understood by one of ordinary skill in the art.

As used in this specification, the singular forms "a," "an," and "the" include plural referents unless the context clearly dictates otherwise. For example, the term "a member" is intended to mean a single member or a combination of members, "a material" is intended to mean one or more materials, or a combination thereof. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims, are generally intended as "open" terms (e.g., the term "including" should be interpreted as "including but not limited to," the term "having" should be interpreted as "having at least," etc.). For example, the terms "comprise(s)" and/or "comprising," when used in this specification, are intended to mean "including, but not limited to." While such open terms indicate the presence of stated features, integers (or fractions thereof), steps, operations, elements, and/or components, they do not preclude the presence or addition of one or more other features, integers (or fractions thereof), steps, operations, elements, components, and/or groups thereof, unless expressly stated otherwise.

As used herein the term "and/or" includes any and all combinations of one or more of the associated listed items. Said another way, the phrase "and/or" should be understood to mean "either or both" of the elements so conjoined (i.e., elements that are conjunctively present in some cases and disjunctively present in other cases). It should be understood that any suitable disjunctive word and/or phrase presenting two or more alternative terms, whether in the description, claims, or drawings, contemplate the possibilities of including one of the terms, either of the terms, or both terms. Other elements may optionally be present other than the elements specifically identified by the "and/or" clause, whether related or unrelated to those elements specifically identified. Thus, as a non-limiting example, a reference to "A and/or B" can refer to "A" only (optionally including elements other than "B"), to "B" only (optionally including elements other than "A"), to both "A" and "B" (optionally including other elements), etc.

As used herein, "or" should be understood to have the same meaning as "and/or" as defined above. For example, when separating items in a list, "or" or "and/or" shall be interpreted as being inclusive (e.g., the inclusion of at least one, but also including more than one, of a number or list of elements, and, optionally, additional unlisted items). Only terms clearly indicated to the contrary, such as when modified by "only one of" or "exactly one of" (e.g., only one of "A" or "B," "A" or "B" but not both, and/or the like) will refer to the inclusion of exactly one element of a number or list of elements.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements, unless expressly stated otherwise. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B" or "at least one of A and/or B") can refer to one or more "A" without "B," one or more "B" without "A," one or more "A" and one or more "B," etc.

All ranges disclosed herein are intended to encompass any and all possible subranges and combinations of subranges thereof unless expressly stated otherwise. Any listed range should be recognized as sufficiently describing and enabling the same range being broken down into at least equal subparts unless expressly stated otherwise. As will be understood by one skilled in the art, a range includes each individual member and/or a fraction of an individual member where appropriate.

As used herein, the terms "about," "approximately," and/or "substantially" when used in connection with stated value(s) and/or geometric structure(s) or relationship(s) is intended to convey that the value or characteristic so defined is nominally the value stated or characteristic described. In some instances, the terms "about," "approximately," and/or "substantially" can generally mean and/or can generally contemplate a value or characteristic stated within a desirable tolerance (e.g., plus or minus 10% of the value or characteristic stated). For example, a value of about 0.01 can include 0.009 and 0.011, a value of about 0.5 can include 0.45 and 0.55, a value of about 10 can include 9 to 11, and a value of about 100 can include 90 to 110. Similarly, a first surface may be described as being substantially parallel to a second surface when the surfaces are nominally parallel. While a value, structure, and/or relationship stated may be desirable, it should be understood that some variance may occur as a result of, for example, manufacturing tolerances or other practical considerations (such as, for example, the pressure or force applied through a portion of a device, conduit, lumen, etc.). Accordingly, the terms "about," "approximately," and/or "substantially" can be used herein to account for such tolerances and/or considerations.

Referring to the drawings, FIG. 1 is a schematic illustration of a system 100 for quantifying target product accumulation and/or erosion, according to an embodiment. The target product can be cultivated on or in a deployment 102 deployed in a suitable body of water (e.g., estuary, ocean, etc.). The deployment 102 can include any number of cultivation apparatus 104. Each cultivation apparatus 104 can include one or more sensors 106 to sense, detect, measure, capture, and/or quantify one or more characteristics and/or images relevant to the species of target product disposed on the cultivation apparatus 104. The sensors 106 on each cultivation apparatus 104 can be communicably coupled to a server 114 via a network 108. In some instances, the server 114 can also be communicably coupled to one or more external data sources 110 via the network 108.

As discussed above, target product(s) can include and/or encompass a wide variety of species including but not limited to microalgae, macroalgae, plankton, marine bacteria, archaea filter feeders (such as oysters or clams), and/or crustaceans. The target product can be grown on a deployment 102 deployed in a suitable water body. The deployment 102 can be made up of any number cultivation apparatus 104 (described in further detail below). For instance, deployment 102 can include and/or can be an assembly of several cultivation apparatus 104. In some embodiments, a deployment 102 can include and/or can be an assembly of ten(s) of cultivation apparatus 104. In some embodiments, a deployment 102 can include and/or can be an assembly of hundred(s) of cultivation apparatus 104. In some embodiments, a deployment 102 can include and/or can be an assembly of thousand(s) of cultivation apparatus 104. In some embodiments, a deployment 102 can include and/or can be an assembly of ten(s) of thousands of cultivation apparatus 104. In some embodiments, a deployment 102 can include and/or can be an assembly of hundred(s) of thousands of cultivation apparatus 104. In some embodiments, a deployment 102 can include and/or can be an assembly of million(s) of cultivation apparatus 104. In some embodiments, a deployment 102 can include and/or can be an assembly of more than a billion cultivation apparatus 104.

The cultivation apparatus 104 can be any suitable shape, size, and/or configuration. In some embodiments, for example, the cultivation apparatus 104 can be similar to or substantially the same as any of the cultivation apparatus described in U.S. Pat. No. 11,382,315 (the "'315 patent"), filed Jun. 8, 2021, entitled "Systems and Methods for the Cultivation of Target Product;" U.S. Provisional Patent Application No. 63/278,243 (the "'243 provisional"), filed Nov. 11, 2021, entitled "Systems and Methods for Monitoring Accumulation of a Target Product;" U.S. Provisional Patent Application No. 63/323,285 (the "'285 provisional"), filed Mar. 24, 2022, entitled "Floating Substrates for Offshore Cultivation of Target Products and Methods of Making and Using the Same;" U.S. Provisional Patent Application No. 63/323,286 (the "'286 provisional"), filed Mar. 24, 2022, entitled "Floating Substrates Including Carbonaceous Coatings for Offshore Cultivation of Target Products and Methods of Making and Using the Same;" U.S. Provisional Patent Application No. 63/393,381 (the "'381 provisional"), filed Jul. 29, 2022, entitled "Systems and Methods for Sequestering Carbon Dioxide Using Alkaline Fluids;" and/or U.S. Provisional Patent Application No. 63/401,959 (the "'959 provisional"), filed Aug. 29, 2022, entitled "Ocean Based Carbon Removal Systems and Methods of Using the Same," the disclosure of each of which is incorporated herein by reference in its entirety.

For example, in some implementations, the cultivation apparatus 104 can include a first member (e.g., a buoy) configured to provide buoyancy at least temporarily to various components of the cultivation apparatus 104, a second member configured to cultivate and accumulate one or more target products (e.g., marine species), and/or, optionally, a release component to separate, disconnect, release and/or decouple the buoy from the member. In some instances, the first member or buoy of the cultivation apparatus 104 (referred to herein as first member) can also be configured to receive a species of target product (e.g., macroalgae gametophytes and/or sporophytes). In some implementations, the first member can be any suitable shape, size, and/or configuration. For example, in some embodiments, the first member can be a ring-like shape, triangular shape, disc, sphere, cylinder, cone, toroid, cuboid, polyhedral or any other geometrical shape. In some embodiments, the first member can be an irregular shape. In some embodiments, one or more portions of the first member can be formed of a porous and/or hollow material configured to provide buoyancy. In some embodiments, one or more portions of the first member can be formed of a material relatively permeable to oxygen, carbon dioxide, water, and water-soluble nutrients to enable growth of target product. In some embodiments, one or more portions of the first member can be formed of a relatively transparent material configured to allow absorption of visible light.

Similarly, the second member is configured to cultivate and accumulate one or more species of the target product can be any suitable shape, size, and/or configuration. For example, in some embodiments, the second member can be a ring-like shape, triangular shape, disc, sphere, cylinder, cone, toroid, cuboid, polyhedral or any other geometrical shape. In some embodiments, the second member can be an irregular shape. In some embodiments, one or more portions of the second member can be formed of a porous and/or hollow material configured to provide buoyancy. In some embodiments, one or more portions of the second member can be formed of a material relatively permeable to oxygen, carbon dioxide, water, and water-soluble nutrients to enable target product growth. In some embodiments, one or more portions of the second member can be formed of a relatively transparent material configured to allow absorption of visible light. In some embodiments the shape, size, and/or configuration of the second member can be similar to or substantially the same as the shape, size, and/or configuration of the first member or buoy. In other embodiments, the shape, size, and/or configuration of the second member can be different than the shape, size, and/or configuration of the first member or buoy.

The cultivation apparatus 104 can be used to seed one or more species of a target product(s) that may be utilized in carbon sequestration. For example, in some instances, the first member of the cultivation apparatus 104 can be seeded with a target product species (e.g., macroalgae gametophytes and/or sporophytes) that become positively buoyant as they mature, and the second member of the cultivation apparatus 104 can be seeded with a target product species (e.g., macroalgae gametophytes and/or sporophytes) that become negatively buoyant as they mature. In some embodiments, the first and second members of the cultivation apparatus 104 can be seeded with positively and negatively buoyant target product(s), respectively, and then deployed on oceans, lakes, rivers, and/or any other suitable body of water. The cultivation apparatus 104 can be further configured to be positively buoyant when initially deployed on oceans, lakes, rivers, and/or any other suitable body of water. In some embodiments, the cultivation apparatus 104 can be configured to float for a predetermined period of time after being deployed on oceans, lakes, rivers and/or any other body of water, and then gradually sink as the second member seeded with negatively buoyant target product grows and obtains biomass.

While the cultivation apparatus 104 is described above as including the first member that is seeded with a target product that becomes positively buoyant as the target product matures, in other implementations, the first member can be seeded with a target product that is and/or that becomes negatively buoyant as the target product matures. In some implementations, for example, the first member and the second member can be seeded with the same target product or different target products that each become negatively buoyant as the target products mature.

In some implementations, regardless of buoyancy, the first and second members of the cultivation apparatus 104 can be seeded with target products based on any number of characteristics associated with the growth and/or accumulation of the target product. For example, in some implementations, the first member can be seeded with a target product that has a rate of growth that increases with and/or is otherwise preferential to direct sunlight, while the second member can be seeded with a target product that has a rate of growth that would be slowed and/or that would be harmed if exposed to direct sunlight. Thus, in such implementations, the target product seeded on the first member can, for example, receive a desired amount of direct sunlight while providing shade for the target product seeded on the second member. In some implementations, the first member can be seeded with a target product that can withstand rough surface conditions, while the second member can be seeded with a target product that may, for example, have a faster growth rate or greater biomass accumulation but may be more fragile than the target product seeded on the first member. In a similar manner, any suitable characteristics can be considered when determining the target products seeded on the first and/or second member of the cultivation apparatus 104.

In some implementations, only the second member is seeded with a target product while the first member acts, at least temporarily, as a buoy or the like that is not seeded with a target product. For example, the first member can be a buoy or the like that can include and/or house any number of components, controllers, sensors, imaging devices, communication devices, radios, etc. configured to collect data associated with the cultivation apparatus 104 and/or an environment in which the cultivation apparatus is deployed (e.g., an area of the ocean), to process, analyze, compress, condition, transform, etc. the collected data, and/or to transmit the data to, for example, the server 114 via the network 108, as described in further detail herein.

In some embodiments, the release component of the cultivation apparatus 104 can be configured to degrade and/or mechanically separate, disconnect, detach, release and/or decouple from the first member and/or the second member. For example, the release component can be configured to detach, release, and/or decouple after a predetermined amount of time has elapsed, after the selected species of target product has grown and/or obtained a predetermined amount of mass, and/or after a signal or group of signals operable to actuate the release component have been received. In some implementations, the detaching, releasing, and/or decoupling can allow the first member (and any target product attached thereto) to float and the second member (and any target product attached thereto) to sink. The first member can be then retrieved and/or reused while the second member sinks to the bottom of the body of water (e.g., ocean), which in turn, can sequester carbon dioxide captured by and/or associated with the grown target product. In implementations in which the first member is seeded, the target product can be harvested and used and/or sold for any suitable purpose. In some implementations, including electronic components (e.g., sensors, imaging devices, tracking devices, communication devices, compute devices, etc.) in or on the first member that is configured to float after being detached can allow the components to be reused in another deployment. In some instances, the first member can be retrieved, and data associated with the cultivation apparatus 104 and/or the target product that is stored in a memory device or the like can be downloaded and/or retrieved.

While one implementation of the cultivation apparatus 104 is described above it should be understood that it is presented by way of example only any not limitation. Other cultivation apparatus can be used where desirable. For example, in some embodiments, the cultivation apparatus 104 can be and/or can include one or more portions forming one or more substrates, which may or may not be seeded, directly or indirectly, with a target product. In some implementations, the cultivation apparatus 104 and/or portions or substrates thereof may be formed and/or sourced from naturally occurring materials, as described in the '285 provisional. In some implementations, the cultivation apparatus 104 and/or portions or substrates thereof may be formed from and/or coated with one or more carbonaceous coatings, alkaline minerals, and/or the like, as described in the '286 provisional. In some implementations, the cultivation apparatus 104 and/or portions or substrates thereof can be formed using and/or otherwise can be configured to release alkaline fluids and/or the like, as described in the '381 provisional. In some implementations, the cultivation apparatus 104 and/or portions or substrates thereof can be configured to deliver and/or transport any suitable payload to a desired area of a body of water such as an ocean (e.g., a payload configured to sequester carbon or to facilitate the ocean's ability or capacity to transfer carbon from the fast carbon cycle (atmospheric CO2) to the slow carbon cycle (deep ocean)), as described in the '959 provisional.

Each cultivation apparatus 104 can be coupled to, or associated with one or more sensors 106 to sense, detect, measure, capture, and/or quantify one or more characteristics and/or images relevant to the target product cultivated on the cultivation apparatus 104. In some embodiments, the sensors 106 can be mechanically coupled to the cultivation apparatus 104 and/or a portion of the cultivation apparatus 104 (e.g., the positively buoyant first member or substrate). In some embodiments, the sensors 106 can be electronically coupled to the cultivation apparatus 104 and/or a portion of the cultivation apparatus 104. In some embodiments, the sensors 106 can include one or more sensors configured to sense, detect, and/or measure water temperature, irradiance, dissolved oxygen concentration, pH, concentration of nutrients, concentration of dissolved carbon, salinity, plant size, plant density, and/or other characteristics related to target product growth, the cultivation apparatus 104, and/or the environment in which the cultivation apparatus 104 is deployed.

In some embodiments, the sensors 106 can be included in or on a sensor buoy, apparatus, and/or substrate, which may or may not be seeded with and/or otherwise directly used to cultivate a target product. In such embodiments, one or more sensor buoys, apparatus, and/or substrates can be included in a deployment of many cultivation apparatus 104 (e.g., hundreds, thousands, tens of thousands, hundreds of thousands, millions, etc.) and can provide data associated with the deployment, target product accumulation on one or more cultivation apparatus 104, environmental conditions, and/or any other suitable data. In some embodiments, the one or more sensors 106 can be similar to and/or substantially the same as any of the sensors described in the '243 provisional. Similarly, any of the sensors 106 may be implemented and/or otherwise included in any suitable manner such as those described in the '243 provisional. Examples of sensors are provided below for context and are not intended to be limiting in any way. Other sensors or other types of sensors may be used in addition to any of the sensors described below or as an alternative to any of the sensors described below.

In some embodiments, the sensors 106 can include pressure-release depth sensors configured to measure, and/or record the sinking rate of one or more portions of a cultivation apparatus 104. The pressure-release depth sensors can be configured to measure, and/or record the sinking rate as a function of time after the cultivation apparatus 104 is seeded with target product and deployed on oceans, lakes, rivers, and/or any other suitable body of water. For example, the pressure-release depth sensors can be configured to measure the sinking rate of the cultivation apparatus 104, decouple from the cultivation apparatus 104 once the cultivation apparatus 104 reaches a predetermined depth threshold, return to the surface, and emit the sinking rate information recorded via satellite or other wireless communication (e.g., to the server 114 via the network 108). In some instances, the sinking rate of the cultivation apparatus 104 can be used (e.g., by the server 108) to quantify the mass and related carbon captured and/or sequestered. In some instances, the pressure-release depth sensors of the sensors 106 can be used to determine whether the cultivation apparatus 104 has sunk below a predetermined depth or threshold associated with and/or suitable for the permanent sequestration carbon.

In some embodiments, the sensors 106 can be configured to sense, detect, and/or monitor target product growth, mass generation, and/or mass yield upon the cultivation apparatus 104 being seeded with target product, and being deployed on oceans, lakes, rivers, and/or any other suitable body of water. In some embodiments, the sensors 106 can include underwater cameras or other imaging technologies configured to image, record, and/or monitor any number of target products (e.g., plants and/or heterokonts like kelp, macroalgae, etc.), number of fronds per target product, frond dimensions, and/or density associated to target product growth. For example, in some embodiments the sensors 106 can include a stereoscopic camera system equipped with two or more lenses including separate image sensors to simulate human binocular vision and thus facilitate obtaining images with perception of depth. In some embodiments, the stereoscopic camera system can be equipped with one or more rectilinear lenses, fisheye lenses, and/or anamorphic lenses configured to produce detailed images of the target product growing on the cultivation apparatus 104. In some embodiments, the stereoscopic camera system can be configured to perform multiple image post processing steps. For example, in some embodiments, the stereoscopic camera system can include a post processing step to analyze the images generated by the lenses and identify and/or correct distortions using algorithms that estimate distortion parameters and camera matrix through the use of, for example, a Levenberg-Marquardt solver and/or any other suitable curve fitting methods. In some embodiments, the stereoscopic camera system can include multiple post processing steps such as color correction, brightness/contrast, sharpness, backscatter removal, cropping and the like. In some implementations, the post processing steps can include analyzing the image data using computer vision and/or other machine learning techniques to determine characteristics of the target product represented in the image data. In some embodiments, the stereoscopic camera system can capture the raw image data and transmit the data to the server 114, which in turn, can perform any of the post processing steps just described.

In some embodiments, the sensors 106 can also include cameras equipped with Photosynthetically Active Radiation (PAR) sensors or other irradiance measuring devices configured to measure photosynthetic light levels in air and water in the 400 to 761 nm range (or any other suitable range of wavelength). The PAR sensors can be configured to measure photosynthetic photon flux density (PPFD) or the power of electromagnetic radiation in the visible light spectral range in micromoles of photons per square meter per second. The data captured by the PAR sensors or other devices can be used (e.g., by the server 114) to estimate, determine, and/or quantify the intensity of solar light that is available to the target product disposed on the cultivation apparatus 104 for photosynthesis, and thus estimate and/or infer the relative health of the target product and/or the rate of growth of target product as well as other marine organisms.

The images and/or image data captured and/or recorded by the cameras of the sensors 106 can be used to quantify and/or estimate, at least in part, the mass accumulated on the cultivation apparatus 104, an amount of mass eroded from the cultivation apparatus 104 (e.g., allowed to naturally break off and sink), and/or changes in the mass (e.g., rate of mass accumulation). The images and/or image data can, for example, provide insights that facilitate evaluating the relative health of the target product. In some embodiments, the images and/or image data captured and/or recorded by the sensors 106 can be transmitted to a server 114. In some instances, the images and/or image data captured and/or recorded by the sensors 106 can be analyzed manually (e.g., manual annotation by a user) to determine the amount of mass on the cultivation apparatus 104, the rate of growth of target product, and/or the amount of $CO_2$ effectively captured by the mass accumulated on the cultivation apparatus 104. For example, in some embodiments, the sensors 106 can initiate image capture (e.g., capture or record images and/or videos of the target product attached to and/or otherwise associated with the cultivation apparatus 104 at different points in time), post process those images (e.g., adjust color, brightness/contrast, sharpness, backscatter removal, removal of noise, cropping and the like) and transmit the images and/or videos (e.g., to the server 114 via the network 108) for data extraction or annotation by a user, and statistical analysis of the extracted data. In other instances, the images captured and/or recorded by the sensors 106 can be analyzed or annotated using computer vision algorithms (e.g., executed on or by the server 114).

In some embodiments, the sensors 106 can include cameras equipped with an anti-fouling system configured to detect, prevent and/or minimize the degradation of the various components of the sensors 106 due to accumulation and/or growth of marine microorganisms, plants, algae, or small animals, as well as the microbiologically influenced corrosion (MIC) generated by metabolites of such marine microorganisms. In some embodiments, the anti-fouling system can include a detection light source such as a Light-Emitting-Diode (LED) lamp configured to direct a beam of light in the ultraviolet (250-280 nm) range to the lenses and/or other components of the underwater cameras and induce the emission of fluorescence by the fluorophores of microorganisms, plants, algae, and/or small animals. The detection light source can be used to trigger a fluorescence response to marine microorganisms deposited on the sensors 106, which can be detected by one or more cameras equipped with suitable detectors such as a charge-coupled device (CCD), an electron-multiplying charge coupled device (EM-CCD), and/or a complementary metal oxide semiconductor (CMOS) detector. The cameras can quantify the intensity of a fluorescence signal that can be used to evaluate the accumulation of marine microorganisms on the sensors 106. In some instances, the detection light source can be used to remove at least a fraction of the marine microorganisms accumulated on the sensors 106 due to the microorganism's low tolerance to the frequency and/or wavelengths of UV radiation generated by the detection light source.

In some embodiments, the sensors 106 can include and/or can be one or more tracking devices configured to produce, and/or transmit signals associated with a relative position of the cultivation apparatus 104 upon (or after) being seeded with target product and deployed on oceans, estuaries, lakes, rivers, and/or any other suitable body of water. The position and/or trajectory of the cultivation apparatus 104 can be transmitted, recorded and/or stored (e.g., by the server 114) and can be further employed by remote sensing devices to determine and/or quantify (directly or indirectly) target product growth, mass production, and/or carbon capture. For example, in some instances, the cultivation apparatus 104 can include a Global Positioning System (GPS) tracking device configured to determine, record, and/or transmit the cultivation apparatus 104 geographic location. In other instances, the cultivation apparatus 104 can include Radio-Frequency Identification (RFID) devices configured to determine, record, and/or transmit the cultivation apparatus 104 geographic and/or trajectory location. In some instances, trajectory data can be used (e.g., by or at the server 114) to determine, calculate, and/or infer mass growth by comparing surface or subsurface conditions (e.g., wind, current, etc.) with subsurface mass motion and/or the like.

In some embodiments, the one or more external data sources 110 can provide information and/or data associated with the body of water (e.g., ocean), weather, deployment of cultivation apparatus 104, etc. In some embodiments, the one or more external data sources 110 can include ocean data sources. Additionally or alternatively, the one or more external data sources 110 can include satellite data sources. In some embodiments, the ocean data and/or the satellite data can include measurements such as ocean surface temperatures, atmospheric temperature and humidity, salinity of the water, color of the water, spectral reflection of the water, nutrient content, alkalinity, nitrogen content, water depth, wave sizes, wave periods, tide information, current direction, current speed, windage, relative position of the deployment 102, dispersion of the deployment 102, density of the deployment 102, and/or the like. In some embodiments, ocean data and/or satellite data can include data obtained from geostationary and/or polar-orbiting meteorological spacecraft. Geostationary and polar-orbiting satellites can provide data that are collected by ground stations. Nonlimiting and/or non-exhaustive examples of external data sources 110 can include HYCOM data sources, the European Centre for Medium Range Weather Forecasts ERA5, ETOPO1 Bathymetry Data from the U.S. National Oceanic and Atmospheric Administration (NOAA), U.S. National Aeronautics and Space Administration (NASA) and/or NOAA remote sensing databases, data sources providing benthic environment data, and/or the like.

In some embodiments, software onboard the one or more external data sources 110 may employ strategies to minimize the usage of costly and power consuming satellite telemetry. These strategies may involve data compression. They may involve data subset selection. They may involve the use of machine learning models to subsample or summarize the data to be transmitted. As such, it may be desirable to verify the data from the one or more external data sources 110 (e.g., via sensor data from the one or more sensors 106). In some embodiments, ocean data and/or satellite data from the external data source(s) 110 can be calibrated with ground truthing and used to quantify biomass production, biomass yield, and/or capacity for carbon capture. For example, surface or subsurface conditions (e.g., ocean surface temperature) can be calibrated with temperature measurements from temperature sensors (e.g., sensor 106) on a cultivation apparatus 104 to determine variances therebetween. In some instances, the data from one or more external data source(s) 110 (e.g., temperature data) can be smoothed and/or otherwise fit using corresponding data from the one or more sensors 106. Knowing a variance between the data collected by the external data source(s) 110 and the data collected by the sensors 106 can, for example, increase an accuracy associated with calculations and/or predictions that are made based on that data. In some instances, calibrating and/or verifying the data can allow inferences to be made associated with the trajectory and/or dispersion of the cultivation apparatus 104 in the deployment 102. Data associated with the trajectory and/or dispersion can then be used to inform, predict, and/or quantify biomass production, biomass yield, capacity for carbon capture, and/or the like. In some embodiments, ocean data and/or satellite data can be used for and/or can otherwise inform decision making processes such as determining initial parameters of one or more modeling algorithms and/or processes such as any of those described herein.

The data associated with the sensors 106 and the one or more external data sources 110 can be transmitted to the server 114 via network 108. The network 108 can be, for example, a digital telecommunication network of servers (e.g., server 114). The server 114 and/or the sensors 106 and the one or more external data sources 110 on the network 108 can be connected via one or more wired or wireless communication networks (not shown) to share resources such as, for example, data storage and/or computing power. The wired or wireless communication networks between server 114 and/or the sensors 106 and the one or more external data sources 110 of the network 108 can include one or more communication channels, for example, a radio frequency (RF) communication channel(s), a fiber optic communication channel(s), an electronic communication channel(s), and/or the like. The network 108 can be and/or include, for example, the Internet, an intranet, a local area network (LAN), virtual local area network (VLAN), and/or the like or combinations thereof.

In some embodiments, data associated with the sensors 106 and the one or more external data sources 110 can be transmitted to the server 114. The server 114 can analyze the received data to determine, calculate, model, predict, estimate, evaluate, etc. target product growth, quantify mass production, and/or mass yield. In other words, data output by the sensors 106 and the one or more external data sources 110 can be analyzed to determine target product growth, mass production, carbon capture and/or sequestration rates, quantities, or capacities, and/or the like, as further described herein. For example, in some embodiments, the data from the sensors 106 can be used to verify and/or truth data from the one or more external data sources 110. For example, satellite data with ocean surface temperature measurement can be compared to temperature measurement data from a sensor on a cultivation apparatus 104. If the comparison yields a consistent difference between the two measurements that is constant, the models described herein can be parametrized by accounting for the difference. This can improve the accuracy of the models. In some embodiments, data from the external data sources 110 can be used to verify and/or truth the data from the sensors 106.

Figure 1B:
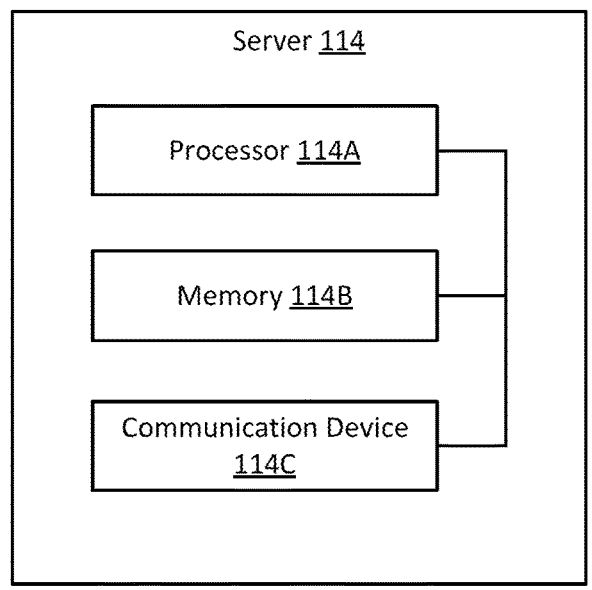
FIG. 1B is a schematic illustration of a server device included in the system of FIG. 1A.

FIG. 1B is a schematic illustration of the server 114 included in the system of FIG. 1A. In some embodiments, the server 114 can include one or more servers and/or one or more processors running on a cloud platform (e.g., Microsoft Azure®, Amazon® web services, IBM® cloud computing, etc.). Generally, the server 114 described here may process data and/or other signals to quantify, verify, predict, and/or infer characteristics relating to the target product, cultivation apparatus, water body, deployment and/or the like for the purposes of carbon sequestration. The server 114 may be configured to receive, process, compile, compute, store, access, read, write, and/or transmit data and/or other signals. In some embodiments, the server 114 can be configured to access or receive data and/or other signals from one or more of a sensor and a storage medium (e.g., memory, flash drive, memory card).

In some embodiments, the server 114 can include at least a processor 114A, a memory 114B, and a communications device 114C. The processor 114A can be any suitable processing device(s) configured to run and/or execute a set of instructions or code. For example, the processor 114A can be and/or can include one or more data processors, image processors, graphics processing units (GPU), physics processing units, digital signal processors (DSP), analog signal processors, mixed-signal processors, machine learning processors, deep learning processors, finite state machines (FSM), compression processors (e.g., data compression to reduce data rate and/or memory requirements), encryption processors (e.g., for secure wireless data and/or power transfer), and/or the like. The processor 114A can be, for example, a general-purpose processor, central processing unit (CPU), microprocessor, microcontroller, Field Programmable Gate Array (FPGA), an Application Specific Integrated Circuit (ASIC), a processor board, a virtual processor, and/or the like. The processor 114A can be configured to run and/or execute application processes and/or or other modules, processes and/or functions associated with the system 100. The underlying device technologies may be provided in a variety of component types (e.g., metal-oxide semiconductor field-effect transistor (MOSFET) technologies like complementary metal-oxide semiconductor (CMOS), bipolar technologies like generative adversarial network (GAN), polymer technologies (e.g., silicon-conjugated polymer and metal-conjugated polymer-metal structures), mixed analog and digital, and/or the like.

The memory 114B can be any suitable memory device(s) configured to store data, information, computer code or instructions (such as those described above), and/or the like. In some embodiments, the memory 114B can be and/or can include one or more of a random access memory (RAM), static RAM (SRAM), dynamic RAM (DRAM), a memory buffer, an erasable programmable read-only memory (EPROM), an electrically erasable read-only memory (EEPROM), a read-only memory (ROM), flash memory, volatile memory, non-volatile memory, combinations thereof, and the like. In some embodiments, the memory 114B can store instructions to cause the processor 114A to execute modules, processes, and/or functions associated with the system 100, such as training probabilistic models, executing models, aggregating the models, etc.

The communication device 114C can be any suitable device(s) and/or interface(s) that can communicate with the network 108 (e.g., any or the devices, sensors, and/or data sources described above, and/or any combination or part thereof). Moreover, the communication device 114C can include one or more wired and/or wireless interfaces, such as, for example, Ethernet interfaces, optical carrier (OC) interfaces, and/or asynchronous transfer mode (ATM) interfaces. In some embodiments, the communication device 114C can be, for example, a network interface card and/or the like that can include at least an Ethernet port and/or a wireless radio (e.g., a WiFi® radio, a Bluetooth® radio, etc.). In some embodiments, the communications device 114C can include one or more satellite antenna. In some embodiments, the communications device 114C can be communicably coupled to an external device that includes one or more satellite antenna, or a power source such as a battery or a solar panel. In some embodiments, the communications device 114C can be configured to (1) read one or more characteristics relevant to the target product, (2) transmit signals representative of the cultivation apparatus, deployment, and/or the target product characteristics to one or more external devices, and/or (3) receive from one or more external devices signals operable to control the sensors (e.g., sensors 106 in FIG. 1A).

Figure 2:
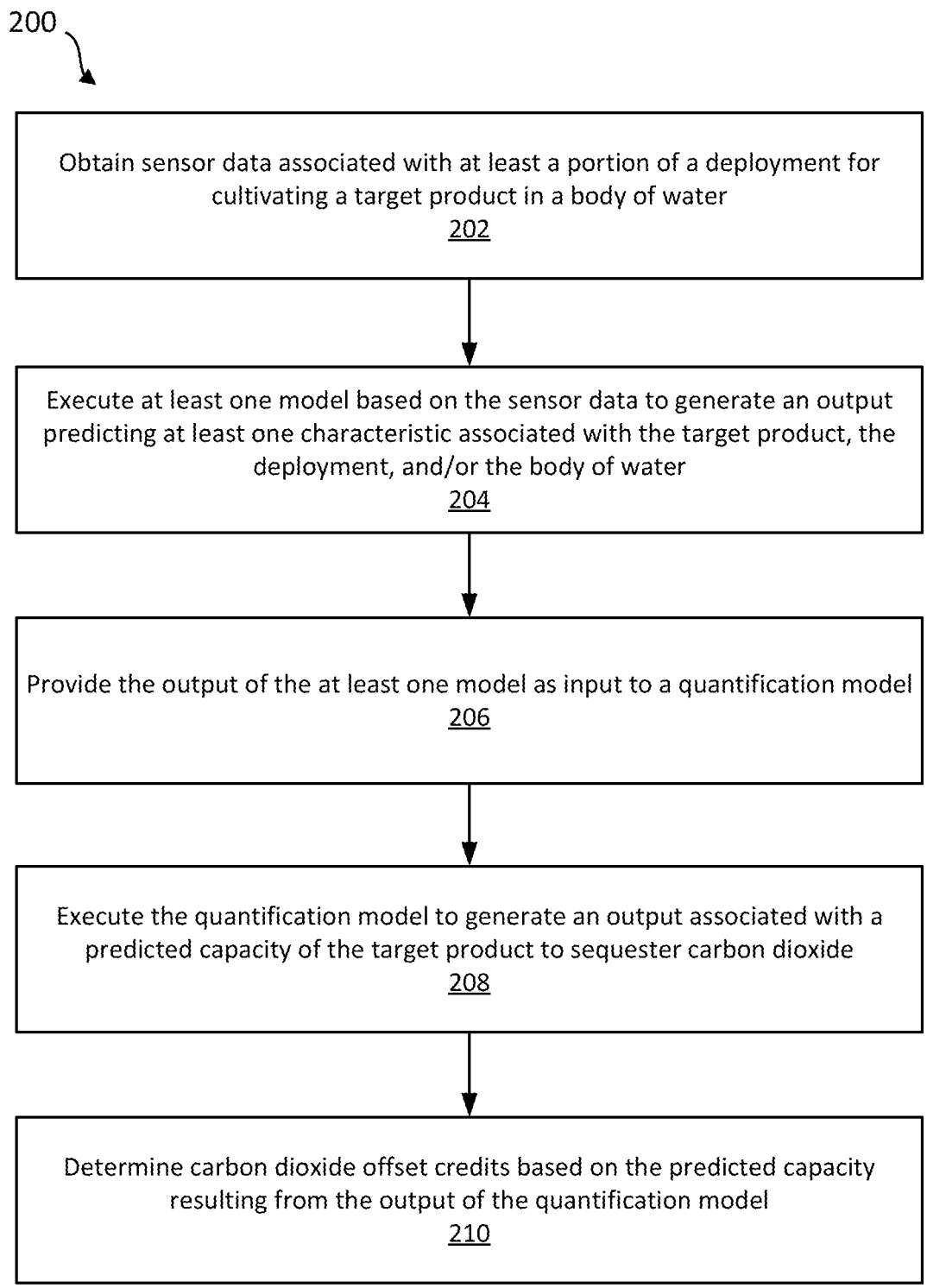
FIG. 2 is a flow chart of an example method of determining carbon dioxide offset credits, according to an embodiment.

In some implementations, the server 114 can be configured to perform processes and/or execute programs, algorithms, models, and/or the like associated with determining target product accumulation (and/or erosion) and, for example, a corresponding capacity for capturing and sequestering carbon dioxide. For example, FIG. 2 is a flowchart illustrating a method 200 of determining carbon dioxide offset credits, according to some embodiments. In some implementations, the method 200 can determine and/or can be used to determine carbon dioxide offset credits using and/or otherwise associated with the system 100 described above with reference to FIGS. 1A and 1B. At 202, the method 200 includes obtaining sensor data associated with at least a portion of a deployment for cultivating a target product in a body of water (e.g., an ocean). The sensor data can be obtained and/or received by a server (e.g., the server 114). The sensor data can include data from sensors (e.g., the one or more sensors 106), one or more external data sources (e.g., the one or more external data sources 110), and/or any other data source. For example, one or more cultivation apparatus (e.g., the cultivation apparatus 104) can include sensors such as GPS devices, cameras, environmental sensors, etc. such as any of those described above. The sensor data can include data associated with the ocean such as temperature of ocean surface, salinity, nutrient availability, etc., data from the satellites such as weather forecast, temperature, humidity, etc., and data from cultivation apparatus such as target product growth, sinking rate of one or more portions of a cultivation apparatus, cultivation apparatus float time as a function of size and/or wave intensity, float time for trajectory sensors and/or the like, cultivation apparatus and/or substrate size distribution and/or behavior at given depths, dispersion, water temperature, irradiance, dissolved oxygen concentration, concentration of nutrients, concentration of dissolved carbon, carbonate dissolution, salinity, plant size, plant density, mass yield, etc.

At 204, the method 200 includes execution of at least one model from a number of models to generate an output. The output may predict at least one characteristic associated with the target product, the deployment, and/or a portion of the ocean in which the deployment is disposed. The at least one model can receive as inputs sensor data obtained at 202 and, in some instances, one or more outputs of at least some models of the multiple models. The output of each of the multiple models can predict either characteristic(s) associated with the target product (e.g., growth accumulation of the target product, mass yield, sinking rate, etc.), characteristic(s) associated with cultivation apparatus and/or deployment (e.g., dispersion of the cultivation apparatus and/or deployment, ocean depth, etc.), characteristic(s) associated with the environment in which the cultivation apparatus and/or the deployment are deployed (e.g., characteristics associated with an ocean or portion of the ocean), and/or any other characteristic(s). At 206, the output of at least one of the models at 204 is provided as input to a quantification model.

At 208, the method 200 includes execution of the quantification model. The quantification model can be a combination and/or an aggregation of multiple models (e.g., probabilistic model, statistical model, predictive model, etc.). Execution of the quantification model can result in the quantification model generating an output associated with target product accumulation (with or without considering erosion of the target product) and/or a predicted capacity of the target product to sequester carbon. Since the quantification model is or can be an aggregation of several models, the predicted capacity of the target product to sequester carbon based on the output of the quantification model can have greater accuracy than the predicted and/or inferred capacity based on individual output of each individual model (e.g., each of the models at 204).

At 210, the method 200 includes determining, calculating, and/or predicting carbon dioxide offset credits based on the predicted capacity resulting from the output of the quantification model. For example, in some embodiments, an amount of carbon that can be sequestered per unit of target product can be calculated and sold in a carbon credit market (or any other suitable market) as a credit tied to and/or otherwise associated with the calculated capacity of a target product (or at least a portion or amount thereof) to sequester that carbon.

Models

Any of the systems and/or methods described herein can be configured to perform processes and/or execute algorithm, models, and/or programs associated with determining, calculating, inferring, and/or predicting target product growth, accumulation, and/or erosion and a corresponding capacity of the target product to capture and sequester carbon dioxide. For example, the system 100 described above with reference to FIGS. 1A and 1B can be used to cultivate a target product on any number of cultivation apparatus 104. The deployment 102 including the cultivation apparatus 104 and the target products seeded thereon can be deployed in a desired body of water (e.g., an ocean). As the target product grows and/or accumulates biomass (and/or begins to naturally erode biomass) the one or more sensors 106 of the cultivation apparatus 104 can sense and/or capture data associated with the deployment 102, the cultivation apparatus 104, and/or the target product (e.g., growth, accumulation, and/or other characteristics). In addition, one or more external data sources 110 can provide data related to the environment where the deployment 102 is located. The data from the one or more sensors 106 and/or one or more external data sources 110 can be provided to and/or received by the server 114 or other compute device, which in turn, can execute any number of analyses, processes, algorithms, programs, etc. such as, for example, the models described below (e.g., machine learning models, artificial intelligence models, neural networks, and/or the like).

In some implementations, the data provided as input into the models described herein can be associated with and/or classified into one of a number of different data categories. The categories are related to and/or indicative of the information, measurements, etc. included in the data. For example, as used herein, "in sample" can refer to data (e.g., information, measurements, etc.) that facilitates and/or is otherwise used in initial model building, initial parameter estimation or determination, model training or tuning, etc. In some instances, sample data can be collected from a data source (e.g., sensors, external data sources, empirical observations and/or calculations, etc.) and a model such as any of the models described herein can be trained and/or executed using the data to provide a fit for the data, a forecast or prediction based on the data, and/or any other output. As such, the data input into the model is "in sample" data. The "in sample" data and/or measurements can be used for model fitting, updating, and/or informing the parameters of a model. As used herein, a model using and/or trained based on "in sample" data is referred to as a "reinforced" model.

As used herein, "out of sample" can refer to data (e.g., information, measurements, etc.) provided to a model that is not included in the sample data used, for example, to train the model (i.e., the "in sample" data). For example, in sample data associated with a first cultivation apparatus can be used to train a reinforced model. The reinforced model, in turn, can provide "in sample" forecasting and/or predictions associated with the first cultivation apparatus. In some instances, the reinforced model can also be used to generate a forecast and/or prediction associated with a second cultivation apparatus different from the first cultivation apparatus. In this instance, data associated with the second cultivation apparatus is referred to as "out of sample" data. The out of sample data associated with the second cultivation apparatus is input into the reinforced model, which in turn, can output an "out of sample" forecast and/or prediction associated with the second cultivation apparatus. As used herein, a model using "out of sample" data and and/or using an output of a reinforced model based at least in part on out of sample data is referred to as an "aggregated" model. As such, in sample data can be, for example, "fed back" into a reinforced model for training, fitting, updating, forecasting, and/or predicting based on the in-sample data, while an output of the reinforced model based at least in part on out of sample data can be "fed forward" to and/or used as an input for an aggregated model, which in turn, can provide a forecast and/or prediction associated with the out of sample data.

In addition, in sample data and out of sample data can be "direct" data or "proxy" data. As used herein, "direct" data (e.g., information, measurements, etc.) can refer to data that is obtained directly from the target product, cultivation apparatus, and/or deployment. In some implementations, "direct" data can be data and/or information that is determined empirically based on direct measurements and/or observations (e.g., performed in a laboratory, which may or may not be on-site where a cultivation apparatus or the like is deployed). As used herein, "proxy" data (e.g., information, measurements, etc.) can refer to data that is obtained from one or more sensors and/or external data sources (e.g., any of the sensors 106 and/or external data sources 110, respectively, described above with reference to FIG. 1A), which may or may not be associated with and/or received from a specific cultivation apparatus of interest. In some instances, "proxy" data can be used to infer characteristics, information, etc. associated with, for example, the deployment 102 that can include large numbers of individual cultivation apparatus 104 (e.g., hundreds of thousands or more).

Reinforced Calibration Model

Figure 3:
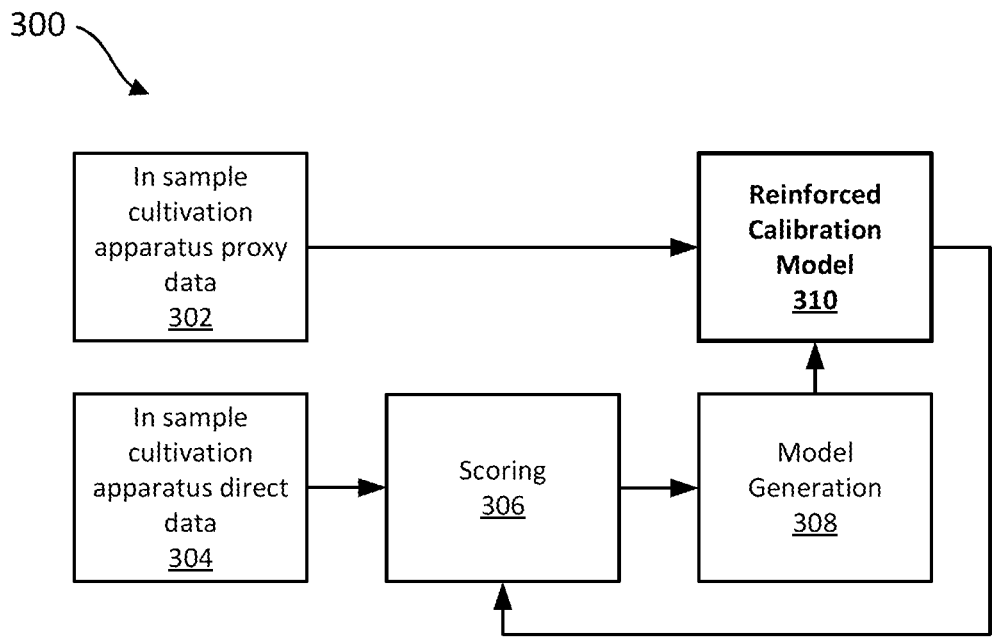
FIG. 3 is a flowchart illustrating a method and/or process of training a reinforced calibration model, according to some embodiments.

FIG. 3 is a flowchart illustrating a method and/or process 300 of training a reinforced calibration model 310, according to some embodiments. In some implementations, the reinforced calibration model 310 can model, forecast, and/or predict the amount of growth of a target product on a given cultivation apparatus (e.g., structurally and/or functionally similar to the cultivation apparatus 104 described above with reference to FIG. 1A). In some embodiments, the reinforced calibration model 310 can be an iteratively trained model. The reinforced calibration model 310 can be trained using in sample cultivation apparatus proxy data 302 and in sample cultivation apparatus direct data 304. In some embodiments, the in-sample data (e.g., in sample cultivation apparatus proxy data, measurements, etc. and/or in sample cultivation apparatus direct data, measurements, etc.) can facilitate initial model building (e.g., initial building and/or generation of the reinforced calibration model 310) and can facilitate initial parameter estimation and/or definition (e.g., initial parameter estimation and/or definition for the reinforced calibration model 310).

The in-sample cultivation apparatus direct data 304 can be data and/or measurements that are obtained directly from the target product. For example, the target product can be extracted from the cultivation apparatus and can be analyzed (e.g., analyzing the tissue of the target product in a laboratory such as an on-site or mobile laboratory and/or the like) to determine, for example, the carbon content for the target product, the mass of the target product, the yield of the target product, etc. The in-sample cultivation apparatus proxy data 302 can include data and/or measurements obtained from one or more sensors (e.g., any of the sensors 106 described above with reference to FIG. 1A) associated with the cultivation apparatus. For example, image data from the cultivation apparatus can be used to determine the mass of the target product, yield of the target product, area of the cultivation apparatus, etc., which in turn, can allow for and/or can inform a determination and/or calculation of the carbon content of the target product. Additionally or alternatively, the in-sample cultivation apparatus proxy data 302 can also include remote sensing data and/or measurements received from one or more external data sources (e.g., any of the external data sources 110 described above with reference to FIG. 1A).

In some embodiments, the output of the reinforced calibration model 310 can be scored (e.g., scoring 306 shown in FIG. 3) in comparison to the in-sample cultivation apparatus direct data 304 (e.g., direct measurements). This score can inform perturbations (e.g., noise, deviations, adjustments, and/or changes—usually small—configured to regulate and/or tune a machine learning model) made to the reinforced calibration model 310 during the next iteration. Perturbations can enable determining one or more changes to parameter values. For example, perturbations can be achieved through a stateful model generation step which can be used to change parameter values of the reinforced calibration model 310. For instance, the reinforced calibration model 310 can be a neural network such as, for example, a long short-term memory (LSTM) model. The LSTM model can comprise gates that regulate addition and removal of information to cell states. At every time step, the state of these gates can change. Accordingly, the perturbations (e.g., feedback cycle) can enable the change of parameter values of the reinforced calibration model 310 at every time step, as desired, thereby changing the state of the gates of the reinforced calibration model 310. This feedback cycle repeats until the reinforced calibration model 310 output score converges to a target or threshold score (e.g., a desired criterion) or saturates.

In some embodiments, the score can be based at least in part on non-parametric scoring. In some embodiments, the score can be based at least in part on weighted scoring. In some embodiments, the scoring can be such that weights can be assigned to nodes and/or units of the reinforced calibration model 310 based at least in part on a comparison of the reinforced calibration model 310 output to the in-sample cultivation apparatus direct data 304 (e.g., error). Said another way, an error that is representative of the difference between the output of the reinforced calibration model 310 and the in-sample cultivation apparatus direct measurements 304 can be determined. The weights can be assigned to the nodes and/or units of the reinforced calibration model 310 based on the error, thereby tuning and/or training the reinforced calibration model 310.

For example, an output of the reinforced calibration model 310 can be assigned a weight, score, cost, and/or a penalty (referred to herein as "weight") based on the error. For instance, overestimation by the reinforced calibration model 310 can result in a first weight being assigned to the output of the reinforced calibration model 310 and underestimation by the reinforced calibration model 310 can result in a second weight being assigned that is different from the first weight. Similarly, if the error is below a certain threshold amount or percentage (e.g., 0.1%, 0.5%, 1%, 2%, 3%, 4%, 5%, 6%, 7%, 8%, 9%, 10%, 15%, 20%, or more), the reinforced calibration model 310 can be assigned a predetermined weight that is based on the error. However, for all errors above the threshold percentage, the reinforced calibration model 310 can be assigned a constant or global weight related to all outputs of the reinforced calibration model. Similarly, if the output of the reinforced calibration model 310 is a false positive, the reinforced calibration model 310 can be assigned a weight that may be different from a weight assigned if the output of the reinforced calibration model 310 is a false negative. In this manner, scores associated with the output of the reinforced calibration model can be assigned, where a higher or better score can be associated with a higher degree of accuracy or, for example, a higher degree of correlation between an output of the reinforced calibration model 310 and direct or empirical observation, data, and/or measurement.

In some implementations, the parameters of the reinforced calibration model 310 can be updated based on the score associated with an output. For instance, as discussed above, the initial parameters for the model can be generated using in sample cultivation apparatus direct measurements 304 during the model generation step 308. The parameters can be updated at model generation step 308 with every iteration and/or time step. In some embodiments, the reinforced calibration model 310 can be a matrix transformation, a non-linear model, a feature model, a neural network, a combination thereof, and/or the like. The output of the reinforced calibration model 310 can be representative of the growth of the target product on a cultivation apparatus. In some embodiments, the reinforced calibration model 310 can predict any suitable characteristic associated with the target product such as mass of the target product, yield of the target product, carbon content of the target product, etc. In some embodiments, one or more of these characteristics can be representative of the growth of the target product and/or can be used to forecast, predict, infer, and/or otherwise determine (referred to herein for simplicity as "predict") the growth of the target product.

Aggregated Field Observations

Figure 4:
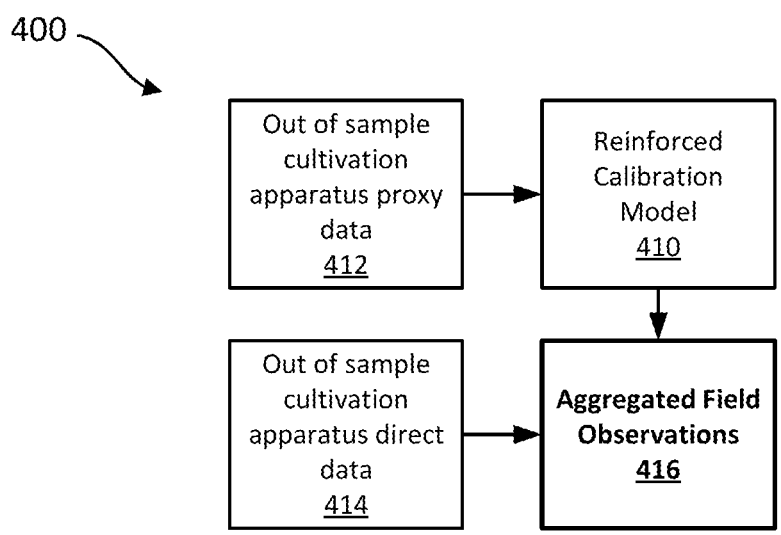
FIG. 4 is a flowchart illustrating a method and/or process of executing an aggregated field observations model, according to some embodiments.

FIG. 4 is a flowchart illustrating a method and/or process 400 of executing an aggregated field observations model 416, according to some embodiments. In some embodiments, out of sample cultivation apparatus proxy measurements 412 of one or more characteristics of the target product (e.g., carbon content for the target product, mass of the target product, yield of the target product, etc.) can be inputs to a reinforced calibration model 410 (e.g., reinforced calibration model 310 in FIG. 3). Said another way, the out of sample cultivation apparatus proxy measurements 412 are fed forward through the reinforced calibration model 410, which can be trained (based on in sample data), for example, using the process and/or method described above with reference to the reinforced calibration model 310. The output of the reinforced calibration model 410 can be an input to the aggregated field observations model 416. The input of the aggregated field observations model 416 can also include out of sample cultivation apparatus direct data 414 (e.g., data from a cultivation apparatus different from the cultivation apparatus providing the in-sample cultivation apparatus data used by the reinforced calibration model 310). That is, the output of the reinforced calibration model 410 (using the out of sample cultivation apparatus proxy data 412—e.g., data received from one or more sensors or other data sources) and the out of sample cultivation apparatus direct data 414 (e.g., empirical or direct measurements taken, for example, on site of a deployment, in a laboratory, and/or the like) can be aggregated and/or executed in or by the aggregated field observations model 416. In some embodiments, the aggregation can be achieved through incorporation of out of sample cultivation apparatus direct data 414 as input to the aggregated field observations model 416, and/or through parametric or non-parametric summarization of the out of sample cultivation apparatus direct data 414 combined with the output of the reinforced calibration model 410.

As discussed above, the out of sample direct data 414 can be data and/or measurements that are obtained directly from the target product. For example, the target product can be extracted from the cultivation apparatus and can be analyzed (e.g., analyzing the tissue of the target product) to determine the carbon content for the target product, the mass of the target product, the yield of the target product, etc. The out of sample cultivation apparatus proxy data 412 can include data and/or measurements obtained from one or more sensors (e.g., any of the sensors 106 described above with reference to FIG. 1A) associated with the cultivation apparatus and/or one or more remote sensing data sources (e.g., any of the external data sources 110 described above with reference to FIG. 1A). For example, image data from the cultivation apparatus can be used to determine the mass of the target product, area of the cultivation apparatus, etc.

Since the aggregated field observations model 416 is executed using the output of the reinforced calibration model 410, an accuracy of a prediction output by (or determined or inferred based on the output of) the aggregated field observations model 416 can be greater than an accuracy of a prediction output by (or determined or inferred based on the output of) the reinforced calibration model 410. Accordingly, in some instances, the aggregated field observations model 416 can predict the amount of growth of a target product on a cultivation apparatus with greater accuracy than, for example, the reinforced calibration model 410 alone. In some embodiments, the aggregated field observations model 416 can predict any suitable characteristic associated with the target product such as mass of the target product, yield of the target product, carbon content of the target product, etc. In some embodiments, one or more of these characteristics can be representative of the growth of the target product. Accordingly, the aggregated field observations model 416 can predict the characteristic associated with the target product with greater accuracy than, for example, the reinforced calibration model 410 alone.

While described above as providing a prediction associated with one or more characteristics of the target product, in other instances, the aggregated field observations model 416 can be used to verify, quantify, forecast, and/or predict any suitable characteristic and/or parameter associated with a target product, cultivation apparatus, deployment, and/or environmental condition of an area where the deployment is located. In such instances, the data received, considered, and/or used can be limited to data associated with the desired characteristic and/or parameter. In some instances, for example, the aggregated field observations model 416 can be used to verify, for example, proxy data received from one or more sensors and/or external data sources.

Reinforced Dispersion Model

Figure 5:
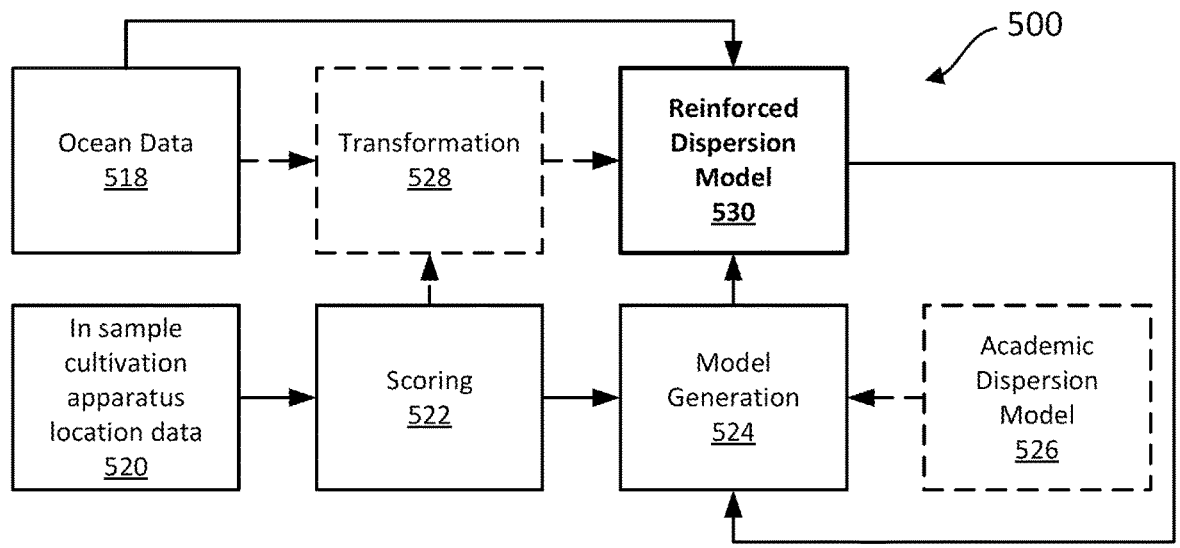
FIG. 5 is a flowchart illustrating a method and/or process of training a reinforced dispersion model, according to some embodiments.

FIG. 5 is a flowchart illustrating a method and/or process 500 of training a reinforced dispersion model 530, according to some embodiments. In some implementations, the reinforced dispersion model 530 can predict and/or summarize the location and/or dynamics of the cultivation apparatus of the deployment or a subset of the deployment in a body of water (e.g., the ocean). In some embodiments, the reinforced dispersion model 530 can be one or more models configured to apply or execute any number of equations of motion associated with the fluid dynamics of the surface ocean, such as LaGrangian or Eulerian drifting dynamics models and/or the like. In some embodiments, these models can be parameterized to allow adjustment or perturbations for fluid dynamical factors such as, for example, drag of the cultivation apparatus, substrates, and/or any other drifting object (s); sub-resolution-scale turbulence; and/or the like. In some embodiments, the models may be implementations of numerical analysis and/or solutions to equations of motions such as Runge-Kutta methods, and/or the like. In some embodiments, the models may be aided by the online assimilation of empirical data and/or aided by a parametric or non-parametric interpolation such as exponential smoothing, kriging, and/or the like.

In some implementations, the reinforced dispersion model 530 can model and/or predict destruction or alteration of a cultivation apparatus, substrate, and/or any other drifting object by degradation or dissolution in the ocean. In such implementations, the reinforced dispersion model 530 may be and/or may incorporate a cumulative damage model based on, for example, Miner's Rule, and/or the like, in which ocean data 518 such as wave energy caused by windage, temperature, and/or local saturation states of solutes participating in dissolution is used to model and/or predict damage, failure, fatigue, etc. of at least a portion of a cultivation apparatus, substrate, and/or any other drifting object.

For example, the reinforced dispersion model 530 can infer the geographical dispersion of an entire deployment. The geographical dispersion of the entire deployment can be used to predict and/or forecast the trajectories for individual cultivation apparatus and/or the population dynamics of the cultivation apparatus 104 before they are released into the ocean. The geographical dispersion of the cultivation apparatus can be used to infer product growth, and quantify mass production, mass yield, carbon capture, etc. For example, the geographical dispersion of the cultivation apparatus can be used by remote sensing techniques (e.g., near-infrared aerial photography, SPOT multispectral imagery, aerial digital multispectral imaging systems (DMSC), and/or the like) to further determine product growth, and quantify mass production, mass yield, and carbon capture. In some embodiments, the trajectory data can be used to determine, calculate, and/or infer mass growth or can be used to inform such determinations, calculations, and/or inferences, for example, by comparing surface or subsurface conditions (e.g., wind, current, etc.) with subsurface mass motion and/or the like.

In some embodiments, the reinforced dispersion model 530 can be an iteratively trained model. The reinforced dispersion model 530 can be trained using in sample cultivation apparatus location data 520 and ocean data 518. As discussed above, the in-sample data and/or measurements (e.g., in sample cultivation apparatus location data 520) can facilitate initial model building (e.g., initial building and/or generation of the reinforced dispersion model 530) and can facilitate initial parameter estimation (e.g., initial parameter estimation for the reinforced dispersion model 530). For instance, model generation at 524 can include generating the model and the initial parameter estimations using in sample cultivation apparatus location data 520. The in-sample cultivation apparatus location data 520 can be measurements obtained from one or more sensors (e.g., any of the sensors 106 described above with reference to FIG. 1A) associated with the cultivation apparatus. For example, in sample cultivation apparatus location data 520 can be obtained from a GPS tracking device and/or an RFID device integrated with, coupled to, and/or associated with the cultivation apparatus. The ocean data 518 can be remotely sensed (e.g., satellite or drone measured) or can be in situ data. Ocean data 518 can include surface temperatures, atmospheric temperature and humidity, salinity of the body of water, color of the ocean, nutrient content, alkalinity, nitrogen content, wave sizes, wave periods, tide information, current direction, current speed, windage, and/or the like. In some embodiments, the ocean data 518 can include data obtained from one or more external data sources (e.g., any of the external data source(s) 110 described above with reference to FIG. 1A).

In some embodiments, transformations 528 can be made to the input data (e.g., the ocean data 518), for example, to change the dimensionality of the reinforced dispersion model 530, or to summarize the input data in space, in time, in ocean depth, or in metrics conjugate or derivative to the primary data (e.g., in variance, rate of change, etc.). In some embodiments, transformations 528 can be made to the ocean data 518 in order to reduce the noise in the data. For instance, transformations 528 can reduce the random variations in the ocean data 518 and smooth the ocean data 518 so that it can be used as input to the reinforced dispersion model 530. For example, temperature measurements of the ocean surface can include random variations. Consider an uncharacteristically warm day in January which introduces random variation and/or noise to temperature measurements obtained for January. Performing transformations 528 to such measurements such as by curve fitting, applying exponential moving average, random walk, etc. can smooth the data and eliminate the noise in the data. In some embodiments, the output of the reinforced dispersion model 530 can be scored (e.g., scoring 522) in comparison to the transformed input data. This score can inform perturbations made to the reinforced dispersion model 530 during the next iteration. Perturbations can allow changes to parameter values. For example, perturbations can be achieved through a stateful model generation step which can be used to change parameter values of the reinforced dispersion model 530, as described above with reference to the reinforced calibration model 310. This feedback and/or iterative cycle repeats until the reinforced dispersion model 530 output score converges to a target or threshold score or saturates.

Similar to the reinforced calibration model 310 discussed with reference to FIG. 3, in some embodiments, the score can be based on non-parametric scoring. In some embodiments, the score can be based on weighted scoring. In some embodiments, the scoring can be such that weights can be assigned based on a comparison of the reinforced dispersion model 530 output to the in-sample cultivation apparatus location data 520 (e.g., error). Said another way, an error that is representative of the difference between the output of the reinforced dispersion model 530 and the in-sample cultivation apparatus location data 520 can be determined. The weights can be assigned based on this error, as described above with reference to the reinforced calibration model 310. For example, the weights can be assigned based on an overestimation and/or underestimation by the reinforced dispersion model 530, whether the error exceeds a threshold percentage, and whether the output of the reinforced dispersion model 530 is false positive or a false negative, etc. The parameter for the reinforced dispersion model 530 can be updated based on the scoring. In some embodiments, model generation 524 (e.g., initial model building and/or model generation of the reinforced dispersion model 530) can include generating the model from existing ocean dispersion model created for academic, historical, and/or record-keeping purposes (e.g., an academic dispersion model 526). The output of the reinforced dispersion model 530 can be representative of the geographical dispersion and/or the trajectory of the entire deployment.

Aggregated Population Dynamics

Figure 6:
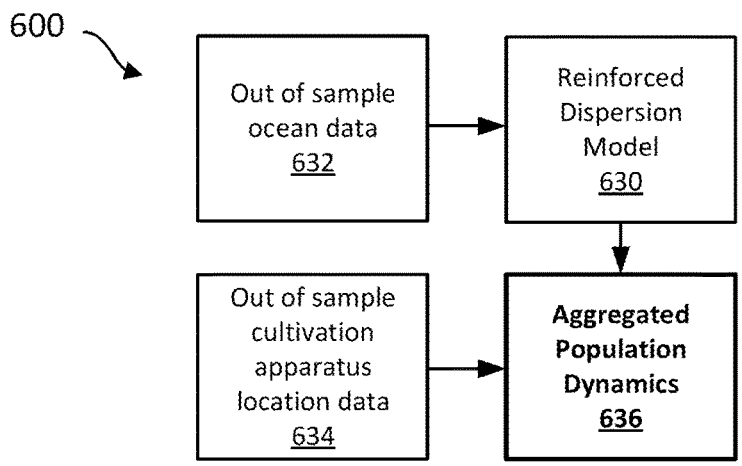
FIG. 6 is a flowchart illustrating a method and/or process of executing an aggregated population dynamics model, according to some embodiments.

FIG. 6 is a flowchart illustrating a method and/or process 600 of executing an aggregated population dynamics model 636, according to some embodiments. In some embodiments, out of sample ocean data 632 can be inputs to a reinforced dispersion model 630 (e.g., the reinforced dispersion model 530 shown in FIG. 5). Said another way, the out of sample ocean data 632 are fed forward through the trained reinforced dispersion model 630, which can be trained (based on in sample data), for example, using the process and/or method described above with reference to the reinforced dispersion model 530. The output of the reinforced dispersion model 630 can be an input to the aggregated population dynamics model 636. The input of the aggregated population dynamics model 636 can also include out of sample cultivation apparatus location data 634. That is, the output of the reinforced dispersion model 630 and the out of sample cultivation apparatus location data 634 can be aggregated and/or executed in or by the aggregated population dynamics model 636. In some embodiments, the reinforced dispersion model 630 can be aided by online assimilation of the out of sample data 634 as a step in the process of producing and/or defining the aggregated population dynamics model 636 (or an output thereof). In some embodiments, the aggregation can be achieved through incorporation of out of sample cultivation apparatus location data 634 as input to the aggregated population dynamics model 636, and/or through parametric or non-parametric summarization of the out of sample cultivation apparatus location data 634 combined with the output of the reinforced dispersion model 630.

As discussed above, out of sample cultivation apparatus location data 634 can be data and/or measurements obtained from one or more sensors associated with the cultivation apparatus. For example, out of sample cultivation apparatus location data 634 can be obtained from a GPS tracking device and/or an RFID device integrated with, coupled to, and/or associated with the cultivation apparatus. The out of sample ocean data 632 can be remotely sensed (e.g., satellite or drone measured) or can be in situ data. In some implementations, the out of sample cultivation apparatus location data 634 and/or the out of sample ocean data 632 can be remotely sensed and/or can include data received from one or more external data sources (e.g., the external data sources 110). Since the aggregated population dynamics model 636 is executed using the output of the reinforced dispersion model 630, an accuracy of a prediction output by (or determined or inferred based on the output of) the aggregated population dynamics model 636 can be greater than an accuracy of a prediction output by (or determined or inferred based on the output of) the reinforced dispersion model 630. Accordingly, in at least some instances, the aggregated population dynamics model 636 can predict the geographical dispersion and/or the trajectory of the entire deployment with greater accuracy than, for example, the reinforced dispersion model 630 alone.

Aggregated Environmental Metric

Figure 7:
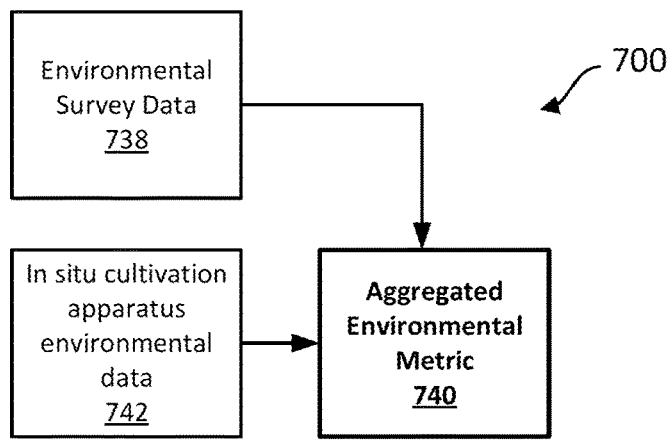
FIG. 7 is a flowchart illustrating a method and/or process of executing an aggregated environmental metric model, according to some embodiments.

FIG. 7 is a flowchart illustrating a method and/or process 700 of executing an aggregated environmental metric model 740, according to some embodiments. In some embodiments, the aggregated environmental metric model 740 can be generated from environmental survey data 738 and in situ cultivation apparatus environmental data 742. The in situ cultivation apparatus data 742 and the environmental survey data 738 can be aggregated through parametric and/or non-parametric mixing (e.g., parametric and/or non-parametric summation).

The in situ cultivation apparatus data 742 can be data and/or measurements obtained from one or more sensors (e.g., any of the sensors 106 described above with reference to FIG. 1A) associated with, integrated with, and/or coupled to the cultivation apparatus. The environmental survey data 738 can be obtained from external data sources (e.g., any of the external data sources 110 described above with reference to FIG. 1A). For example, the environmental survey data 738 can be obtained from satellite data sources such as, for example, geostationary and polar-orbiting satellites. The environmental survey data 738 can include measurements and/or inferences such as temperature, ocean salinity, or ocean concentration of various chemical species, families of species, or atomic species for the entire ocean. However, the in situ cultivation apparatus environmental data 742 can include measurements and/or inferences such as temperature, ocean salinity, or ocean concentration of various chemical species, families of species, or atomic species for the entire ocean, for the cultivation apparatus, and/or the area of the ocean close to the cultivation apparatus. The aggregated environmental metric model 740 can predict and/or verify environmental metrics such as temperature, ocean salinity, ocean alkalinity, ocean concentration etc. for the ocean (or at least a portion thereof) with low uncertainty. In some instances, the aggregated environmental metric model 740 can predict and/or verify environmental metrics with greater accuracy and/or certainty than predictions, determinations, calculations, etc. based on environment survey data 738 alone or the in situ cultivation apparatus data 742 alone.

Reinforced Growth Model

Figure 8:
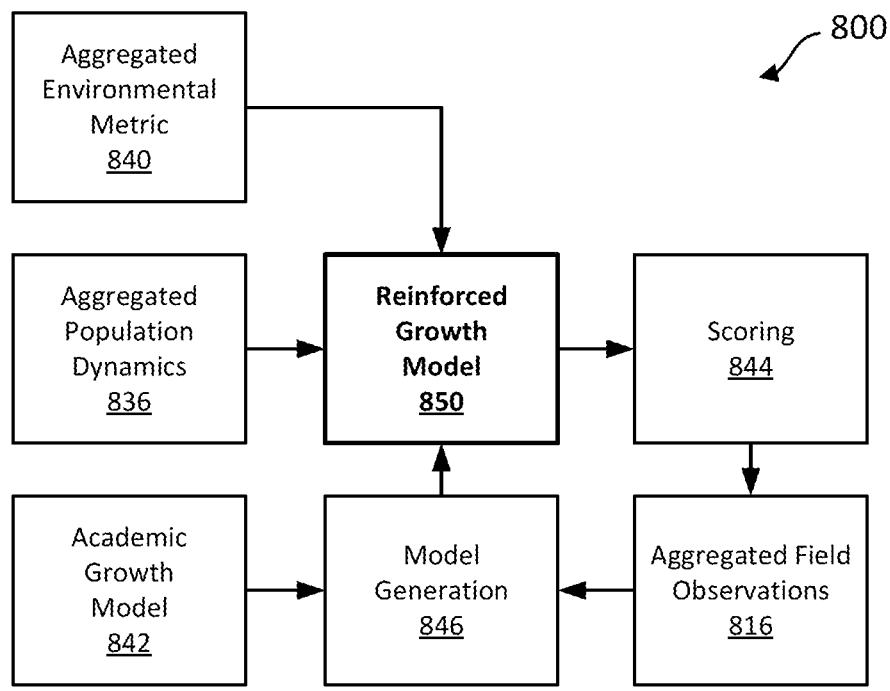
FIG. 8 is a flowchart illustrating a method and/or process of training a reinforced growth model, according to some embodiments.

FIG. 8 is a flowchart illustrating a method and/or process 800 of training a reinforced growth model 850, according to some embodiments. In some embodiments, initial model generation 846 (e.g., initial building and/or generation of the reinforced growth model 850) can include generating the model from existing academic growth models 842 created for academic, historical, and/or record-keeping purposes. In some embodiments, the academic growth models 842 can be any suitable model(s) configured to predict the total biomass, carbon containing biomass, and/or tissue carbon content of an organism. In some embodiments, the academic growth models 842 can originate in and/or can be based at least in part on a scientific study of algae or higher plants (i.e., a group of plants that have vascular tissues). The academic growth models 842 may execute, apply, and/or include differential equations, or several coupled partial differential equations, tracking various internal biological states of an organism and its interaction with the environment. In some embodiments, the academic growth models 842 may explicitly couple or associate the growth of an organism to its experienced environmental conditions, such as, for example, temperature, light, seasonality, nutrient availability, and/or the like. In some embodiments, the academic growth models 842 may couple or associate the growth of an organism or a population of organisms to the dynamics of a broader local ecology, such as, for example, "NPZ models" which couple, analyze, model, and/or predict the dynamics and/or interrelationships of Nitrogen, Phytoplankton, and Zooplankton in an environment and for a given time.

In some embodiments, the inputs to the reinforced growth model 850 can include a combination of outputs from an aggregated population dynamic model 836 (e.g., the aggregated population dynamic model 636 shown in FIG. 6) and outputs from an aggregated environmental metric model 840 (e.g., the aggregated environmental metric model 740 shown in FIG. 7). The combination of the outputs from the aggregated population dynamic model 836 that is representative of the geographical dispersion of the deployment and the outputs from the aggregated environmental metric model 840 that is representative of the environmental metrics for the deployment can, in turn, be provided as an input to the reinforced growth model 850 that is representative of an inference of target product accumulation on the cultivation apparatus of the deployment in the open ocean. More specifically, the target product accumulation of the deployment can be quantitatively modeled as a function of the growing conditions such as the geographical dispersion of the deployment and the environmental metrics for the deployment. In some implementations, the target product accumulation can account for and/or predict an amount of biomass erosion for the deployment, which may be based at least in part on the growing conditions, etc. (e.g., water current conditions, temperatures, pH, salinity, nutrient level, etc.).

In some embodiments, the output of the reinforced growth model 850 can be scored (e.g., scoring 844) and compared to the output of the aggregated field observations 816 (e.g., the aggregated field observations 316 shown in FIG. 3). This score can inform perturbations made to the reinforced growth model 850 during the next iteration and/or during the next model generation step 846. Perturbations can allow changes to parameter values. For example, perturbations can be achieved through a stateful model generation step 846 which can be used to change parameter values of the reinforced growth model 850, as described above with reference to the reinforced calibration model 310 and the reinforced dispersion model 530. This feedback and/or iterative cycle can repeat until the reinforced growth model 850 output score converges to a target or threshold score (e.g., a criterion) or saturates.

Similar to the reinforced calibration model 310 discussed shown in FIG. 3 and the reinforced dispersion model 530 shown in FIG. 5, in some embodiments, the score can be based on non-parametric scoring and/or weighted scoring. For example, in some embodiments, the scoring can be such that weights can be assigned based on a comparison of the reinforced growth model 850 output to the aggregated field observations 816 output (e.g., error). Said another way, an error that is representative of the difference between the output of the reinforced growth model 850 and the output of the aggregated field observations 816 can be determined. The weights can be assigned based on this error, as described above with reference to the reinforced calibration model 310 and/or the reinforced dispersion model 530. For example, the weights can be assigned based on an overestimation and/or underestimation by the reinforced growth model 850, whether the error exceeds a threshold percentage, and whether the output of the reinforced growth model is false positive or a false negative, etc. The parameter for the reinforced growth model 850 can be updated based on the scoring. The output of the reinforced growth model 850 can be representative of and/or can forecast, predict, and/or estimate the target product accumulation for the deployment.

Aggregated Growth Response

Figure 9:
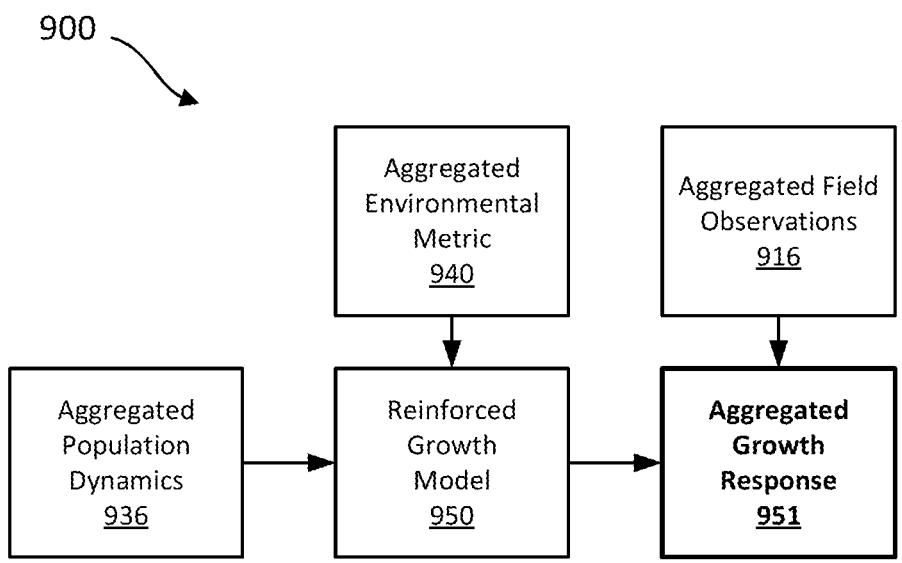
FIG. 9 is a flowchart illustrating a method and/or process of executing an aggregated growth response model, according to some embodiments.

FIG. 9 is a flowchart illustrating a method and/or process 900 of executing an aggregated growth response model 951, according to some embodiments. In some embodiments, a combination of the outputs from an aggregated environmental metric model 940 (e.g., the aggregated environmental metric models 740 (FIG. 7) and/or 840 (FIG. 8)) and the outputs from an aggregated population dynamics model 936 (e.g., the aggregated population dynamics models 636 (FIG. 6) and/or 836 (FIG. 8)) can be inputs to a reinforced growth model 950 (e.g., the reinforced growth model 850 shown in FIG. 8). Said another way, a combination of the outputs from aggregated environmental metric model 940 and the aggregated population dynamics model 936 are fed forward through the reinforced growth model 950.

The output of the reinforced growth model 950 can be an input to the aggregated growth response model 951. The input of the aggregated growth response model 951 can also include output from an aggregated field observations model 916 (e.g., the aggregated field observations models 416 (FIG. 4) and/or 816 (FIG. 8)). That is, the output from the reinforced growth model 950 and output from the aggregated field observations model 916 can be aggregated and/or executed in or by the aggregated growth response model 951. In some embodiments, the aggregation can be achieved and/or implemented by adding, supplementing, aggregating, and/or otherwise incorporating the output from the aggregated field observations model 916 (and/or data associated with the model 916) as input to the aggregated growth response model 951, and/or through online assimilation, parametric, and/or non-parametric interpolation and/or summarization associated with and/or based on the output of the aggregated field observations model 916 (and/or data associated with the model 916) combined with the output from the reinforced growth model 950. In some implementations, the output of the aggregated field observations model 916 (and/or data associated with the model 916) may be direct measurements such as mass, surface area, carbon content, and/or the like. In some implementations, the output of the aggregated field observations model 916 (and/or data associated with the model 916) may be image-derived estimations of mass, surface area, carbon content, and the like achieved through previously trained machine image modeling (e.g., via the reinforced calibration model 310 and/or the like).

The aggregated growth response model 951 can be executed to predict target product accumulation for the deployment. Since the aggregated growth response model 951 is executed using the output from the reinforced growth model 950, an accuracy of a prediction output by (or determined or inferred based on the output of) the aggregated growth response model 951 can be greater than an accuracy of a prediction output by (or determined or inferred based on an output of) the reinforced growth model 950 alone. Accordingly, in at least some instances, the aggregated growth response model 951 can used to predict target product accumulation for the deployment (with or without accounting for a degree or amount of biomass erosion) with greater accuracy than the reinforced growth model 950.

Carbon Credit Quantification

Figure 10:
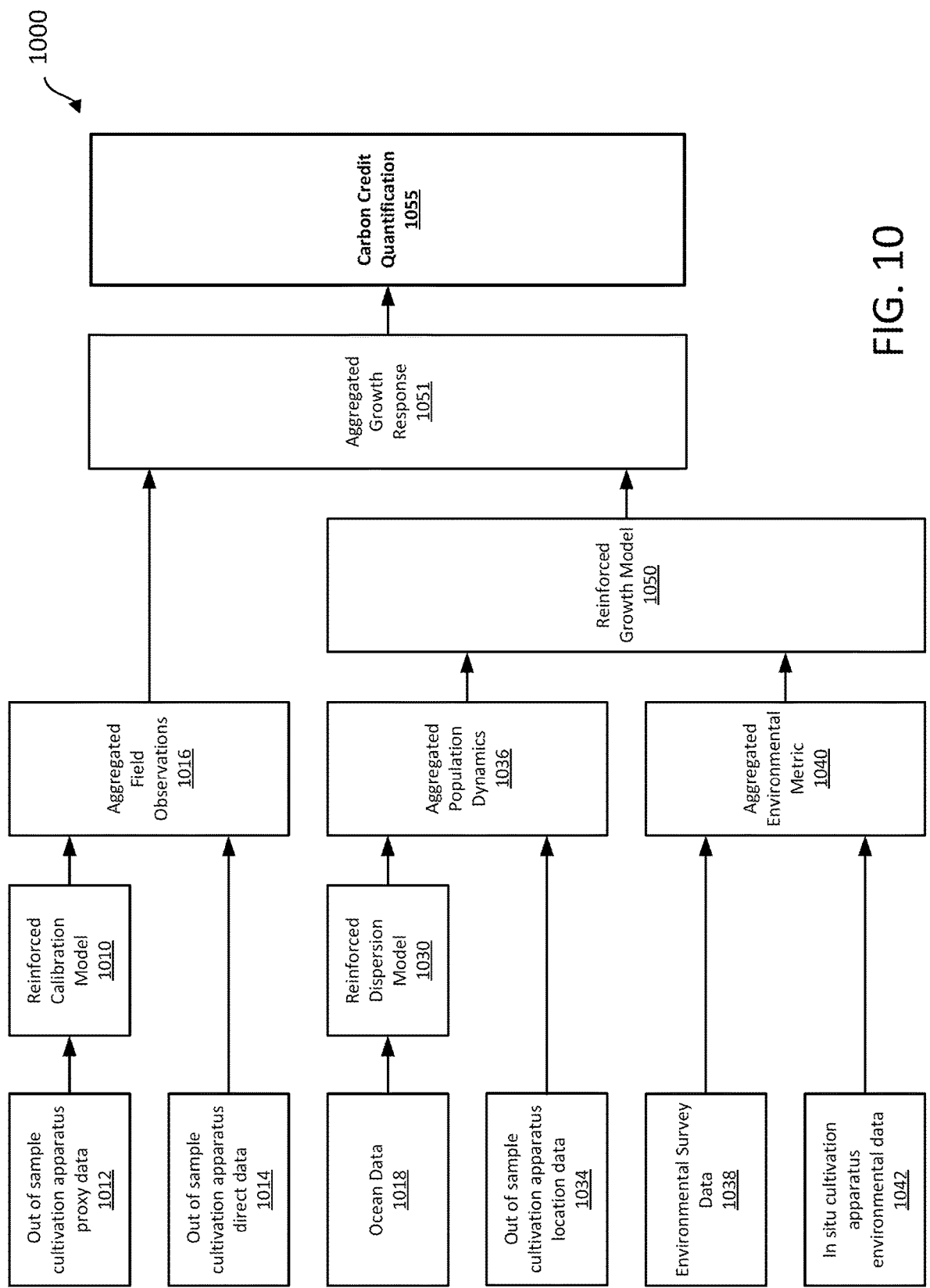
FIG. 10 is a flowchart illustrating a method and/or process of executing a carbon credit quantification model, according to some embodiments.

FIG. 10 is a flowchart illustrating a method and/or process 1000 of executing a carbon credit quantification model 1055, according to some embodiments. In some implementations, the carbon credit quantification model(s) 1055 can be established, defined, generated, etc. in accordance with commercial demands in the marketplace to convert a calculation of net carbon removal into a quantity of marketable credits. In some implementations, the carbon credit quantification model(s) 1055 can apply, define, determine, model, and/or predict a risk-based discount due to analytical uncertainty, statistical variance, and/or the like. In some embodiments, the carbon credit quantification model(s) 1055 can apply, implement, and/or execute a market-facing principle, such as ton-year accounting, and/or the like. In some embodiments, the carbon credit quantification model(s) can generate and/or output separate quantities for credits of various "tranches" distinguished by risk, durability, co-benefits, and/or the like.

As discussed above and seen from FIG. 10, the carbon credit quantification model 1055 can be generated from data output from a combination of multiple models such as a reinforced calibration model 1010 (e.g., the trained reinforced calibration model 410 shown in FIG. 4), an aggregated field observations model 1016 (e.g., the aggregated field observations model 416 shown in FIG. 4), a reinforced dispersion model 1030 (e.g., the trained reinforced dispersion model 630 shown in FIG. 6), an aggregated population dynamics model 1036 (e.g., the aggregated population dynamics model 636 shown in FIG. 6), an aggregated environmental metric model 1040 (e.g., the aggregated environmental metric model 740 shown in FIG. 7), a reinforced growth model 1050 (e.g., the trained reinforced growth model 950 shown in FIG. 9), and an aggregated growth response model 1051 (e.g., the aggregated growth response model 951 shown in FIG. 9).

For example, the out of sample cultivation apparatus proxy data 1012 (e.g., the out of sample cultivation apparatus proxy data 402 shown in FIG. 4) can be fed forward to the reinforced calibration model 1010. The output from the reinforced calibration model 1010 can be aggregated with the out of sample cultivation apparatus direct data 1014 (e.g., the out of sample cultivation apparatus direct measurement 414 shown in FIG. 4) when executing the aggregated field observations model 1016. Similarly, the ocean data 1018 (e.g., the ocean data 518 shown in FIG. 5) can be fed forward to the reinforced dispersion model 1030. Although not shown, in some instances, one or more transformations can be performed on the ocean data 1018 (e.g., processes to normalize, summarize, smooth, fit, etc. the data, as described above with reference to the transformations 528 shown in FIG. 5). The output from the reinforced dispersion model 1030 can be aggregated with the out of sample cultivation apparatus location data 1034 (e.g., the out of sample cultivation apparatus location data 634 shown in FIG. 6) when executing the aggregated population dynamics model 1040. The environmental survey data 1038 (e.g., the environmental survey data 738 shown in FIG. 7) can be aggregated with the in situ cultivation apparatus environmental data 1042 (e.g., the in situ cultivation apparatus environmental data 742 shown in FIG. 7) when executing the aggregated environmental model 1040.

The output from the aggregated population dynamics model 1036 can be combined with the output from the aggregated environmental metric model 1040 and fed forward to the reinforced growth model 1050. The output from the reinforced growth model 1050 can be aggregated with the output from the aggregated field observations model 1016 when executing the aggregated growth response model 1051. Accordingly, since the aggregated growth response model 1051 receives as input and/or is based on a combination of data from the reinforced calibration model 1010, the aggregated field observations model 1016, the reinforced dispersion model 1030, the aggregated population dynamics model 1036, the aggregated environmental metric model 1040, and the reinforced growth model 1050, an accuracy of a prediction by (or determined or inferred based on the output of) the aggregated growth response model 1051 can be greater than an accuracy of the prediction by (or determined or inferred based on the output of) each of these individual models alone.

As shown in FIG. 10, the output from the aggregated growth response model 1051 can be used to execute the carbon credit quantification model 1055 (e.g., can be provided as input to the credit quantification model 1055). Therefore, an accuracy of a prediction by (or determined or inferred based on the output of) the carbon credit quantification model 1055 of an amount, quantity, certainty, value, etc. of carbon dioxide offset credits for the deployment can be greater than an accuracy of a prediction by (or determined or inferred based on the output of) each of the individual models.

For example, the reinforced calibration model 1010 can generate an output associated with and/or used to predict accumulation and/or erosion of the target product for a cultivation apparatus, which in turn, can be used to infer the carbon dioxide offset credits associated with and/or attributed to the cultivation apparatus. As described above, however, the output from the reinforced calibration model 1010 is aggregated with and/or verified against the out of sample cultivation apparatus direct data and/or measurements 1014 when executing the aggregated field observations model 1016, thereby verifying, enhancing, and/or otherwise increasing a certainty of the output of the reinforced calibration model 1010. Accordingly, the aggregated field observations model 1016 can predict accumulation and/or erosion of the target product for a cultivation apparatus with greater accuracy and/or certainty than the reinforced calibration model 1010 alone. This in turn improves a prediction, inference, calculation, and/or determination (or a confidence or certainty therewith) of the carbon dioxide offset credits for the cultivation apparatus.

The reinforced dispersion model 1030 can predict the dispersion of the deployment, which in turn, can provide information and/or data used to infer carbon dioxide offset credits associated with the deployment. As described above, however, the output from the reinforced dispersion model 1030 is aggregated with and/or verified against the out of sample cultivation apparatus location data 1034 when executing the aggregated population dynamics model 1036, thereby verifying, enhancing, and/or otherwise increasing a certainty of the output of the reinforced dispersion model. Accordingly, the aggregated population dynamics model 1036 can predict the dispersion of the deployment with greater accuracy and/or certainty than the reinforced dispersion model 1030 alone. This in turn improves the prediction, inference, calculation, and/or determination (or confidence or certainty therewith) of the carbon dioxide offset credits for the deployment. As described above, the output from the aggregated population dynamics model 1036 is combined or aggregated with and/or verified against the output from the aggregated environmental metric model 1040 when feeding forward through the reinforced growth model 1050. As such, the output from the reinforced growth model 1050 can have greater accuracy and/or certainty than an output resulting from the use of only one of the aggregated population dynamics model 1036 or the aggregated environmental metric 1040.

As described above, the output of the reinforced growth model 1050 is aggregated with and/or verified against the output of the aggregated field observations model 1016 when executing the aggregated growth response model 1051, thereby verifying, enhancing, and/or otherwise increasing a certainty of the output of the reinforced growth model 1050. Accordingly, the aggregated growth response model 1051 can predict an amount of accumulation of the target product with greater accuracy and/or certainty than a prediction from the reinforced growth model 1050 alone or the aggregated field observations 1016 alone. This in turn improves the prediction, inference, calculation, and/or determination (or a confidence or certainty therewith) of the carbon dioxide offset credits for the deployment.

Based at least in part on the output of the aggregated growth response 1051, the carbon credit quantification model 1055 can executed to calculate, determine, and/or map an amount and/or value of carbon credits for and/or associated with the deployment. Although not shown in FIG. 10, in some implementations, the carbon credit quantification model 1055 can receive (in addition to the output of the aggregated growth response model 1051) information and/or data associated with the deployment such as location data, ocean data, etc. In some instances, the data can be received from any suitable data sources such as the sensors and/or external data sources described herein. In some instances, the data can be the ocean data 1018 (or a portion thereof) provided as input into the reinforced dispersion model 1030, the environmental survey data 1038 (or a portion thereof) provided as input into the aggregated environmental metric 1040, and/or any other data provided as input into the previous models. In some instances, the data can be a subset of the ocean data 1018 and/or the environmental survey data 1038 not used in or by the previous models. In some instances, the data can be in addition to and/or different from the data (or subset(s) thereof) provided as input into the previous models. In some instances, the data associated with the deployment can include, for example, location of the deployment in the body of water (e.g., where the deployment is in the ocean), rate(s) of the air/sea flux pulling carbon out of the air, ocean surface or deep water circulation data, ocean tracer diffusion models, ocean chemistry, ocean depth, and/or the like. Accordingly, the carbon credit quantification model 1055 can map, correlate, aggregate, compare, verify, etc. this data with the data associated with the accumulation and/or erosion of the target product output by the aggregated growth response model 1051.

In some instances, the carbon credit quantification model 1055 can be configured to account for uncertainty and/or error stacking associated with the data provided to the aggregated growth response model 1051 (and/or any other data). For example, in some instances, a value can be assigned for a given amount of carbon sequestered for a given time (e.g., a value per unit such as a value per ton, kiloton, megaton, etc. of carbon sequestered for a predetermined time such as 100 years, 500 years, 1,000 years, or more). The output of the aggregated growth response model 1051 can predict and/or determine an amount of biomass accumulation for a deployment and the output of the carbon credit quantification model 1055 can predict and/or determine an amount of carbon sequestered by the deployment and how long the carbon will be sequestered (e.g., based at least in part on sunken depth, and/or the like) with a known degree of uncertainty such as, for example, +/−0.1%, 0.5%, 1.0%, 5%, 10%, or more or any percentage or fraction of a percent therebetween. In some instances, a value or amount of credit associated with the carbon sequestered can be determined based on the amount of biomass accumulation minus, for example, an amount of accumulation associated with and/or otherwise representing the uncertainty. In some instances, a discount or decrease in a value or an amount of credit can be assigned based on the degree or amount of uncertainty, where a greater amount of uncertainty results in a greater discount or reduction in value or amount of credit.

In some implementations, the degree of uncertainty can be associated with and/or can be at least partially a function of a degree of biomass erosion for a deployment. For example, in some implementations, biomass can naturally break off from the target product attached to the cultivation apparatus and can begin to sink. The eroded biomass, however, may be difficult to quantify and it may be infeasible and/or impracticable to confirm whether the eroded biomass has sunk. Accordingly, while a certain amount of biomass erosion can be predicted, determined, and/or otherwise accounted for, biomass erosion can, in some instances, increase a degree of uncertainty associated with target product accumulation for the deployment.

Additionally or alternatively, uncertainty and/or error stacking can be associated with and/or determined and/or assigned based on, for example, one or more scores associated with an output of one or more models (e.g., as described above with reference to the reinforced calibration model 310, the reinforced dispersion model 530, and/or the reinforced growth model 850). For example, a score (e.g., a confidence score) can be assigned for an output of each of the reinforced calibration model 1010, the reinforced dispersion model 1030, and/or the reinforced growth model 1050. With the output of these models being fed forward to, for example, the aggregated growth response model 1051, a confidence score and/or degree of uncertainty can be predicted and/or determined for the output of the aggregated growth response model 1051 (based at least in part on the scores). Accordingly, the carbon credit quantification model 1055 can account for the score and/or degree of uncertainty of the output of the aggregated growth response model 1051 and/or a score and/or degree of uncertainty associated with the output of any other model. In some instances, a higher score can be representative of a greater degree of certainty associated with an output, which in turn, can result in a greater value being assigned for a determined, estimated, and/or predicted amount of carbon sequestered by a deployment.

In some implementations, a value of carbon credits associated with the biomass accumulated for a given deployment can be based at least in part on a depth of the ocean where the biomass is sunk. In such implementations, a shallower depth may result in a length of carbon storage and/or sequestration that shorter than a length of carbon storage and/or sequestration associated with a greater depth. As such, a value of the carbon credits associated with the target product biomass sunk at the greater depth can be greater than a value of the carbon credits associated with substantially the same amount of target product biomass sunk at the shallower depth.

In some instances, the process of providing inputs into the carbon credit quantification model 1055 can include one or more verification and/or normalization steps, procedures, and/or checks, for example, at and/or by at least some of the models, the output of which is fed forward into the next model. In some implementations, verification and/or normalization can ensure that the models are executed using accurate input data (and/or data have a normalized form or otherwise having a desired dimensionality), which in turn, results in a higher accuracy of the output of a subsequent model in the sequence. In this manner, the accuracy of a prediction, inference, calculation, and/or determination of an amount of target product biomass accumulation for a deployment (e.g., an output of the aggregated growth response model 1051) can be greater than a prediction, inference, calculation, and/or determination that could otherwise be made based on each individual model. With an accurate prediction and/or determination of the amount of accumulation for the deployment, a prediction, inference, calculation, and/or determination of carbon dioxide offset credits associated with and/or attributable to the deployment can be made with greater accuracy than could otherwise be made using an estimation of the accumulation allowed by the output of any of the models individually. Accordingly, a value of the carbon dioxide offset credits can be determined with a desired degree of confidence and/or an evaluation of the credits can be made with less uncertainty. Similarly, in some implementations, the data from and/or associated with any of the outputs can be transformed, normalized, vectorized, summarized, and/or the like prior to being fed forward into the next model. Accordingly, the verification and/or transformation of data output by a model can ensure that data with a desired degree of accuracy and/or in a desired format, etc. is fed forward to the next model.

Figure 11:
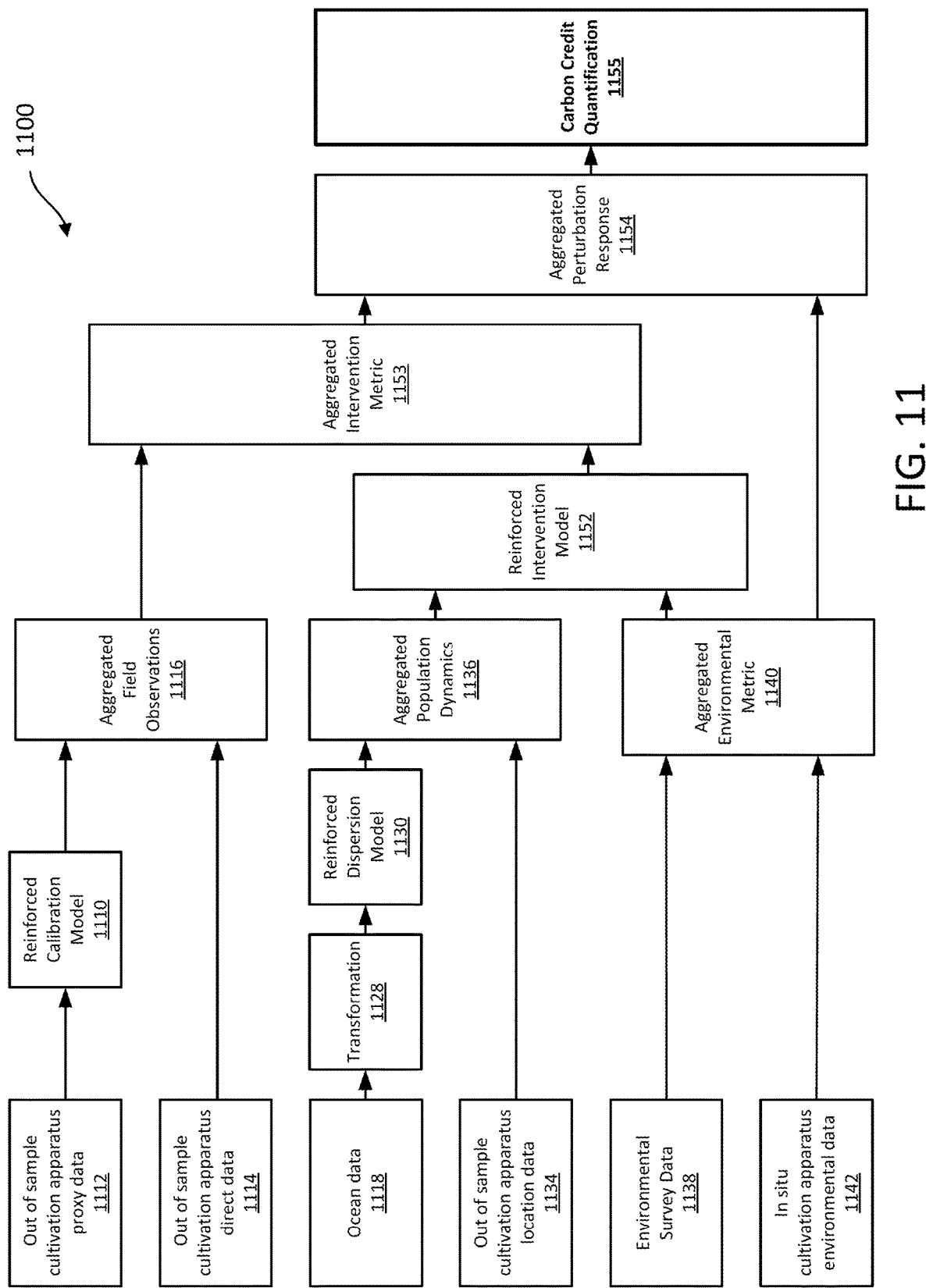
FIG. 11 is a flowchart illustrating a method and/or process of executing a carbon credit quantification model, according to some embodiments.

FIG. 11 is a flowchart illustrating a method and/or process 1100 of executing a carbon credit quantification model 1155, according to some embodiments. As discussed above and seen from FIG. 11, the carbon credit quantification model 1155 can be configured to generate an output from and/or based at least in part on data output from a combination of multiple models such as a reinforced calibration model 1110 (e.g., the trained reinforced calibration model 410 shown in FIG. 4), an aggregated field observations model 1116 (e.g., the aggregated field observations model 416 shown in FIG. 4), a reinforced dispersion model 1130 (e.g., the trained reinforced dispersion model 630 shown in FIG. 6), an aggregated population dynamics model 1136 (e.g., the aggregated population dynamics model 636 shown in FIG. 6), an aggregated environmental metric model 1140 (e.g., the aggregated environmental metric model 740 shown in FIG. 7), a reinforced intervention model 1152, an aggregated intervention metric 1153, and an aggregated perturbation response model 1154. However, while the method 1000 and/or process shown in FIG. 10 is described as predicting carbon dioxide offset credits based on an amount or accumulation of a target product that is sunk to the bottom of a body of water (e.g., an ocean floor), the method and/or process 1100 described below with reference to FIG. 11 can be used to determine and/or predict carbon dioxide offset credits based on any suitable intervention or combination of interventions (including sinking target products to the ocean floor) designed and/or intended to capture and sequester carbon dioxide, and/or to otherwise transfer carbon dioxide from a fast carbon cycle (e.g., atmospheric carbon dioxide) to a slow carbon cycle (e.g., the deep ocean or the like).

For example, as described in detail above, the out of sample cultivation apparatus proxy data 1112 (e.g., the out of sample cultivation apparatus proxy data 402 shown in FIG. 4) can be fed forward to the reinforced calibration model 1110. The output from the reinforced calibration model 1110 can be aggregated with the out of sample cultivation apparatus direct data 1114 (e.g., the out of sample cultivation apparatus direct measurement 414 shown in FIG. 4) when executing the aggregated field observations model 1116. Similarly, the ocean data 1118 (e.g., the ocean data 518 shown in FIG. 5) can be fed forward to the reinforced dispersion model 1130 after a transformation 1128 (e.g., optional processes to normalize, summarize, smooth, fit, etc. the data, as described above with reference to the transformations 528 shown in FIG. 5) is performed. The output from the reinforced dispersion model 1130 can be aggregated with the out of sample cultivation apparatus location data 1134 (e.g., the out of sample cultivation apparatus location data 634 shown in FIG. 6) when executing the aggregated population dynamics model 1140. The environmental survey data 1138 (e.g., the environmental survey data 738 shown in FIG. 7) can be aggregated with the in-situ cultivation apparatus environmental data 1142 (e.g., the in situ cultivation apparatus environmental data 742 shown in FIG. 7) when executing the aggregated environmental model 1140.

The output of the aggregated population dynamics 1136 can be combined with the output from the aggregated environmental metric model 1140 and fed forward to the reinforced intervention model 1152. The reinforced intervention model 1152 is representative of a given carbon removal intervention's conditions, where the carbon removal intervention may include the placement of cultivation apparatus and/or substrates (e.g., passive drifters) into ocean currents, dissolution of a chemical payload into the surface ocean, cultivation of target product(s), and/or the like or combinations thereof (e.g., such as any of the embodiments described in the '315 patent, the '243 provisional, the '285 provisional, the '286 provisional, the '381 provisional, and/or the '959 provisional). In other words, carbon removal intervention can refer to a method, mode, process, and/or system used or executed to capture carbon. Interventions can include the cultivation of target product(s)

that capture carbon via photosynthesis, the chemical reactions resulting from an interaction between a body of water (e.g., an ocean) and a chemical payload (e.g., a carbonate and/or alkaline mineral, fluid, etc.), an enhancement of the ocean's natural ability to capture atmospheric carbon such as, for example, enhancing ocean alkalinity, and/or any other suitable intervention(s). Nonlimiting examples of such interventions are described, for example, with reference to the ocean-based carbon removal platforms, techniques, and/or processes in the '959 provisional.

The reinforced intervention model 1152 can take in a baseline state (e.g., the aggregated environmental metric model 1140), which may include data associated with the carbonate chemistry of surface seawater, the nutrient concentration of surface seawater, and/or the like. The baseline state may include remote sensing measurements such as multispectral ocean color photography as a proxy for chlorophyll content and therefore nutrient availability. The baseline state may include in situ measurements by sensors for species of organic and inorganic nitrogen, bioavailable iron, and/or phosphorus, and/or fluorometers to establish chlorophyll content of a target product as a proxy for nutrient viability (e.g., as described in the '243 provisional). In addition or as an alternative, the in-situ measurements may include partial pressure carbon dioxide ($pCO_2$), alkalinity, total dissolved inorganic carbon, dissolved carbon dioxide ($CO_2$), bicarbonate ion ($HCO_3^-$), and/or carbonate ion ($CO_3^{2-}$) content of the water. The reinforced invention model 1152 may also receive as input and/or may be combined with data representing and/or associated with a dosing rate (e.g., determined, predicted, and/or inferred from the output of the aggregated population dynamics 1136), which may include data resulting from ocean transport modeling to establish the spatial population dynamics of cultivation apparatus and/or substrates (e.g., passive drifters), which may or may not be seeded with a target product), data resulting from cumulative damage models, and/or observational information about disaggregation and dissolution of a deployment as well as the corresponding rate at which chemical payload material may be dissolved into seawater (e.g., via the cultivation apparatus and/or substrates described in, for example, the '285 provisional, the '286 provisional, the '381 provisional, and/or the '959 provisional).

Although not shown, in some implementations, the reinforced intervention model 1152 can be trained in a manner similar to the trained reinforced growth model 950 shown in FIG. 9. The output from the reinforced intervention model 1152 (e.g., after training) can be aggregated with the aggregated field observations 1116 when executing the aggregated intervention metric model 1153. Accordingly, since the aggregated intervention metric model 1153 receives and/or is based on a combination of data from the reinforced calibration model 1110, the aggregated field observations model 1116, the reinforced dispersion model 1130, the aggregated population dynamics model 1136, the aggregated environmental metric model 1140, and/or the reinforced intervention model 1152, an accuracy of a prediction by (or determined or inferred based on the output of) the aggregated intervention metric model 1152 can be greater than an accuracy of prediction by (or determined or inferred based on the output of) each of these individual models alone.

The output of the aggregated intervention metric model 1153, as well as the aggregated environmental metric model 1140 may be fed forward to the aggregated perturbation response model 1154. The aggregated perturbation response model 1154 is initialized to the baseline state, as described in reference to the reinforced intervention model 1152. Accordingly, the baseline state may include data associated with a body of water (e.g., an ocean) in which the intervention is being performed as well as data associated with the intervention being performed or the intervention to be performed, such as a magnitude of dosing resulting from a chemical payload, a predicted amount of target product accumulation, a dispersion and/or dissolution of cultivation apparatus and/or substrates in a deployment, and/or the like (e.g., from the aggregated population dynamics 1136). The aggregated perturbation response model 1154 may track the perturbations resulting from the intervention(s) through the dynamic ocean system and may characterize the chemical and/or biogeochemical rebalancing of ocean processing in the presence of ocean water mixing and physical advection of ocean waves. Perturbation modelling may quantify a drawdown of carbon from an atmospheric and/or hydrospheric carbon cycle to the deep ocean carbon cycle as a result of a given perturbation. Perturbation modelling can in turn be used to predict and/or infer the carbon dioxide offset credits associated with and/or attributed to the intervention (e.g., a cultivation apparatus and/or substrate, a release of a chemical payload, and/or the like). Accordingly, since the aggregated perturbation response model 1154 receives and/or is based on a combination of data from the reinforced calibration model 1110, the aggregated field observations model 1116, the reinforced dispersion model 1130, the aggregated population dynamics model 1136, the aggregated environmental metric model 1140, the reinforced intervention model 1152, and the aggregated environmental metric 1140, an accuracy of a prediction by (or determined or inferred based on the output of) the aggregated perturbation response model 1154 can be greater than an accuracy of prediction by (or determined or inferred based on the output of) each of these individual models alone.

The output of the aggregated perturbation response model 1154 may be fed forward into the carbon credit quantification model 1155. The carbon credit quantification model 1155 can be executed to calculate, determine, and/or map an amount and/or value of carbon credits for and/or associated with the deployment and/or intervention. Although not shown in FIG. 11, in some implementations, the carbon credit quantification model 1155 can receive (in addition to the output of the aggregated perturbation model 1154) information and/or data associated with the deployment such as, location data, ocean data, etc. In some instances, the data can be received from any suitable data sources such as the sensors and/or external data sources described herein. In some instances, the data can be the ocean data 1118 (or a portion thereof) provided as input into the reinforced dispersion model 1130, the environmental survey data 1138 (or a portion thereof) provided as input into the aggregated environmental metric 1140, and/or any other data provided as input into the previous models. In some instances, the data can be a subset of the ocean data 1118 and/or the environmental survey data 1138 not used in or by the previous models. In some instances, the data can be in addition to and/or different from the data (or subset(s) thereof) provided as input into the previous models.

In some instances, such as when the intervention is achieved through seeding or stimulation of atrophic biomass target product (e.g., macroalgae), the carbon credit quantification model 1155 may characterize certain characteristics. The characteristics may include the baseline surface ocean chemistry, the rate and spatial distribution of biomass accumulation and resulting biomass accumulation including carbon uptake pathways from the surface waters, the fate of photosynthetically fixed biomass at the surface ocean and the rate of degradation at the surface or flux to the deep ocean (e.g., ambient or attached to or seeded on a cultivation apparatus and/or substrate), and/or the resulting perturbation to the earth system carbon cycle.

In some instances, the data associated with the deployment and/or other carbon removal intervention can include, for example, location of the deployment in the body of water (e.g., where the deployment is in the ocean), rate(s) of the air/sea flux pulling carbon out of the air, ocean surface or deep water circulation data, ocean tracer diffusion models, ocean chemistry, ocean depth, and/or the like. Accordingly, the carbon credit quantification model 1155 can map, correlate, aggregate, etc. this data with the data associated with the accumulation and/or erosion of the target product output by aggregated intervention metric model 1153 (e.g., performing a function and/or providing an output similar to the aggregated growth response model 1051 described above with reference to FIG. 10). For example, in some implementations, a value of carbon credits associated with the biomass accumulated for a given deployment can be based at least in part on a depth of the ocean where the biomass is sunk. In such implementations, a shallower depth may result in a length of carbon storage and/or sequestration that shorter than a length of carbon storage and/or sequestration associated with a greater depth. As such, a value of the carbon credits associated with the target product biomass sunk at the greater depth can be greater than a value of the carbon credits associated with substantially the same amount of target product biomass sunk at the shallower depth.

In some instances, the carbon credit quantification model 1155 can be configured to account for uncertainty and/or error stacking associated with the data provided to the aggregated perturbation response model 1154. For example, in some instances, a value can be assigned for a given amount of carbon sequestered for a given time (e.g., a value per unit such as a value per ton, kiloton, megaton, etc. of carbon sequestered for a predetermined time such as 100 years, 500 years, 1,000 years, or more). The output of the aggregated perturbation response 1154 can predict and/or determine the effects of an intervention during deployment and the output of the carbon credit quantification model 1155 can predict and/or determine an amount of carbon sequestered by the deployment and how long the carbon will be sequestered (e.g., based at least in part on sunken depth, and/or the like) with a known degree of uncertainty such as, for example, +/−0.1%, 0.5%, 1.0%, 5%, 10%, or more or any percentage or fraction of a percent therebetween. In some instances, a value associated with the carbon sequestered can be determined based on the amount of biomass accumulation minus, for example, an amount of accumulation associated with and/or otherwise representing the uncertainty. In some instances, a discount or decrease in a value can be assigned based on the degree or amount of uncertainty, where a greater amount of uncertainty results in a greater discount or reduction in value.

In some implementations, the degree of uncertainty can be associated with and/or can be at least partially a function of a degree of biomass erosion for a deployment. For example, in some implementations, biomass can naturally break off from the target product attached to the cultivation apparatus and can begin to sink. The eroded biomass, however, may be difficult to quantify and it may be infeasible to confirm whether the eroded biomass has sunk. Accordingly, while a certain amount of biomass erosion can be predicted, determined, and/or otherwise accounted for, biomass erosion can, in some instances, increase a degree of uncertainty associated with target product accumulation for the deployment.

Additionally or alternatively, uncertainty and/or error stacking can be associated with and/or determined and/or assigned based on, for example, one or more scores associated with an output of one or more models (e.g., as described above with reference to the reinforced calibration model 310, the reinforced dispersion model 530, and/or the reinforced growth model 850). For example, a score (e.g., a confidence score) can be assigned for an output of each of the reinforced calibration model 1110, the reinforced dispersion model 1130, and/or the reinforced intervention model 1152. With the output of these models being fed forward to, for example, the aggregated perturbation response model 1154, a confidence score and/or degree of uncertainty can be predicted and/or determined for the output of the aggregated perturbation response model 1154 (based at least in part on the scores). Accordingly, the carbon credit quantification model 1155 can account for the score and/or degree of uncertainty of the output of the aggregated perturbation response model 1154 and/or a score and/or degree of uncertainty associated with the output of any other model. In some instances, a higher score can be representative of a greater degree of certainty associated with an output, which in turn, can result in a greater value being assigned for a determined, estimated, and/or predicted amount of carbon sequestered by a deployment.

In some instances, the process of providing inputs into the carbon credit quantification model 1155 can include one or more verification steps, procedures, and/or checks, for example, at and/or by at least some of the models, the output for which is fed forward into the next model. The verification can ensure that the models are executed using accurate input data, which in turn, results in a higher accuracy of the output of a subsequent model in the sequence. In this manner, the accuracy of a prediction, inference, calculation, and/or determination of an amount of target product biomass accumulation for a deployment (e.g., an output of the aggregated perturbation response model 1154) and/or a result of a given intervention and/or perturbation can be greater than a prediction, inference, calculation, and/or determination that could otherwise be made based on each individual model. With an accurate prediction and/or determination of the result of an intervention (e.g., an amount of accumulation for a deployment of cultivation apparatus and/or substrates, and/or the like), a prediction, inference, calculation, and/or determination of carbon dioxide offset credits associated with and/or attributable to the intervention (e.g., the deployment) can be made with greater accuracy than could otherwise be made using an estimation of the result of the intervention allowed by the output of any of the models individually. Accordingly, a value of the carbon dioxide offset credits can be determined with a desired degree of confidence and/or an evaluation of the credits can be made with less uncertainty.

Figure 12:
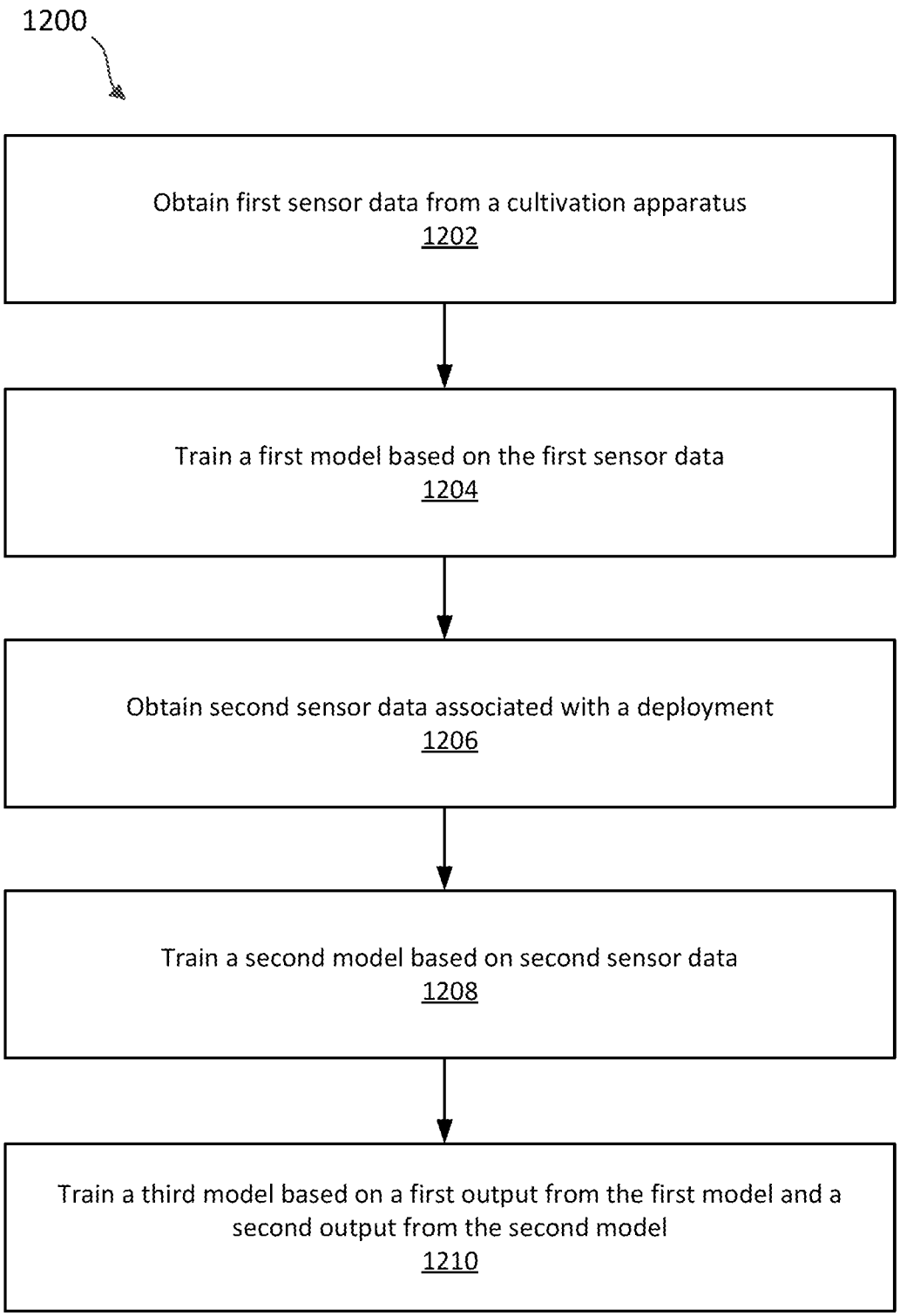
FIG. 12 is a flowchart of an example method for determining accumulation of target product in a deployment that can be used to determine carbon dioxide offset credits, according to some embodiments.

FIG. 12 is a flowchart of an example method 1200 for determining accumulation of target product in a deployment (e.g., the deployment 102 described above with reference to FIG. 1), which in turn, can be used to determine carbon dioxide offset credits, according to some embodiments. At 1202 the method can include obtaining sensor data from one or more sensors (e.g., any of the sensors 106 described above with reference to FIG. 1) associated with a cultivation apparatus (e.g., the cultivation apparatus 104 described above with reference to FIG. 1). The sensor data can include in sample cultivation apparatus proxy data and/or measurements, in sample cultivation apparatus direct data and/or measurements, and/or out of sample cultivation apparatus direct data and/or measurements. At 1204, the method 1200 can include training a model based on the sensor data obtained at 1202. For instance, the model can be a reinforced calibration model and/or an aggregated field observations model. The output of the model can predict a parameter that can be associated with and/or that can be used in determining and/or predicting a growth of the target product of the cultivation apparatus. For instance, the output of the model can be representative of the amount of growth of a target product on a single cultivation apparatus. At 1206, the method 1200 can include obtaining sensor data from one or more sensors associated with a deployment. The sensors can be sensors associated with each individual cultivation apparatus and/or external data sources (e.g., any of the external data source(s) 110 described above with reference to FIG. 1) such as one or more ocean sensor data sources and/or one or more satellite data sources that can obtain data for and/or associated with the entire deployment. At 1208, the method can include training a second model based on the sensor data obtained at 1206. For instance, the model can be a reinforced dispersion model and/or an aggregated population dynamics model. The output of the model can, for example, predict the geographic dispersion of the deployment in the ocean. At 1210, the method 1200 can include training a third model based on the output from the first model trained at 1204 and the output from the second model trained at 1208. The third model can be a reinforced growth model and/or an aggregated growth response model. The output of this model can, for example, predict an amount of accumulation of the target product for all cultivation apparatus of the deployment. In some implementations, the output of the third model, optionally, can be used to execute a carbon quantification model that can be then used to determine the carbon dioxide offset credits for the deployment. As discussed above, the accuracy of prediction by the third model can be greater than the accuracy of prediction by the first model or by the second model.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, an FPGA, an ASIC, and/or the like. Software modules (executed on hardware) can be expressed in a variety of software languages (e.g., computer code), including C, C++, Java™, Ruby, Visual Basic™, Python™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools, and/or combinations thereof (e.g., Python™). Additional examples of computer code include, but are not limited to, control signals, encrypted code, and compressed code.

While various embodiments have been particularly shown and described, it should be understood that they have been presented by way of example only, and not limitation. Various changes in form and/or detail may be made without departing from the spirit of the disclosure and/or without altering the function and/or advantages thereof unless expressly stated otherwise. Where schematics and/or embodiments described above indicate certain components arranged in certain orientations or positions, the arrangement of components may be modified.

Although various embodiments have been described as having particular features and/or combinations of components, other embodiments are possible having a combination of any features and/or components from any of embodiments described herein, except mutually exclusive combinations. The embodiments described herein can include various combinations and/or sub-combinations of the functions, components, and/or features of the different embodiments described.

The specific configurations of the various components can also be varied. For example, the size and specific shape of the various components can be different from the embodiments shown, while still providing the functions as described herein. More specifically, the size and shape of the various components can be specifically selected for a desired or intended usage. Thus, it should be understood that the size, shape, and/or arrangement of the embodiments and/or components thereof can be adapted for a given use unless the context explicitly states otherwise.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

What is claimed:

1. A method, comprising:
    obtaining sensor data associated with at least a portion of a deployment for cultivating a target product in a body of water;
    executing at least one model from a plurality of models based at least in part on the sensor data to generate an output predicting at least one characteristic associated with the target product, the deployment, or a portion of the body of water in which the deployment is disposed, providing as input to a quantification model the output of the at least one model from the plurality of models;

executing the quantification model to generate an output associated with a predicted capacity of the target product of the deployment to sequester carbon dioxide, an accuracy of the predicted capacity resulting from the output of the quantification model being greater than an accuracy of a predicted capacity resulting from the individual output of each model from the plurality of models; and determining carbon dioxide offset credits based on the predicted capacity resulting from the output of the quantification model.

2. The method of claim 1, wherein the sensor data includes data from at least one sensor deployed on at least the portion of the deployment, data from at least one data source associated with the body of water, or data from at least one satellite data source.

3. The method of claim 1, wherein at least the portion of the deployment includes a cultivation apparatus.

4. The method of claim 1, wherein the plurality of models includes at least a first model and a second model, the method further comprising:
aggregating data associated with direct measurements of at least one characteristic of the target product and a first output from the first model, the first output predicting at least one parameter associated with growth of the target product; and
executing, based at least in part on the aggregation, the second model to generate a second output, the second output predicting growth of the target product.

5. The method of claim 4, wherein an accuracy of the predicted growth resulting from the second output is greater than an accuracy of a predicted growth resulting from the first output.

6. The method of claim 1, wherein the plurality of models includes at least a first model, a second model, a third model, and a fourth model, the method further comprising:
executing a first aggregation of a first output from the first model and data associated with direct measurements of at least one characteristic of the target product, the first output predicting at least one parameter associated with growth of the target product;
executing, based at least in part on the first aggregation, the second model to generate a second output, the second output predicting growth of the target product;
executing a second aggregation of a third output from the third model and data associated with direct measurements of at least one characteristic of at least the portion of the deployment, the third output predicting a geographic dispersion of at least the portion of the deployment in the body of water; and
executing, based at least in part on the second aggregation, the fourth model to generate a fourth output, the fourth output predicting a geographic dispersion of the deployment in the body of water.

7. The method of claim 6, wherein an accuracy of the predicted geographic dispersion of the deployment resulting from the fourth output is greater than an accuracy of the predicted geographic dispersion of the deployment resulting from the third output.

8. The method of claim 1, wherein the body of water is an ocean, the plurality of models includes at least a first model, a second model, a third model, a fourth model, a fifth model, and a sixth model, the method further comprising:
executing a first aggregation of a first output from the first model and data associated with direct measurements of at least one characteristic of the target product, the first output predicting at least one parameter associated with growth of the target product;
executing, based at least in part on the first aggregation, the second model to generate a second output, the second output predicting growth of the target product;
executing a second aggregation of a third output from the third model and data associated with direct measurements of at least one characteristic of at least the portion of the deployment, the third output predicting a geographic dispersion of at least the portion of the deployment in the ocean; and
executing, based at least in part on the second aggregation, the fourth model to generate a fourth output, the fourth output predicting a geographic dispersion of the deployment in the ocean;
executing a third aggregation of the second output and a fifth output from the fifth model, the fifth output predicting an amount of accumulation of the target product based at least in part on the fourth output and data associated with at least one environmental characteristic of a portion of the ocean in which the deployment is deployed; and
executing, based at least in part on the third aggregation, a sixth model to generate a sixth output, the sixth output predicting an amount of accumulation of the target product.

9. The method of claim 8, wherein an accuracy of the predicted amount of accumulation of the target product resulting from the sixth output is greater than and accuracy of each of (i) the predicted amount of accumulation of the target product resulting from the fifth output and (ii) a predicted amount of accumulation of the target product resulting from the second output.

10. The method of claim 8, wherein the quantification model receives as an input the sixth output from the sixth model.

11. A method, comprising:
obtaining sensor data associated with at least a portion of a deployment for cultivating a target product in a body of water;
providing at least a portion of the sensor data as input to at least one model from a plurality of models associated with at least one of the target product, the deployment, or a portion of the body of water in which the deployment is disposed;
executing the plurality of models in a predetermined sequence such that an output of a current model is an input for at least one subsequently executed model according to the predetermined sequence;
providing as input to a quantification model an output of a last model from the plurality of models according to the predetermined sequence; and
executing the quantification model to generate an output associated with a predicted capacity of the target product to sequester carbon dioxide.

12. The method of claim 11, further comprising:
determining carbon dioxide offset credits based on the predicted capacity resulting from the output of the quantification model.

13. The method of claim 11, wherein an accuracy of the predicted capacity resulting from the output of the quantification model is greater than an accuracy of a predicted capacity resulting from an output of each model from the plurality of models.

14. The method of claim 11, wherein the providing at least the portion of the sensor data as input to at least one model from the plurality of models includes:
providing a portion of the sensor data to a model from the plurality of models configured to generate an output predicting at least one characteristic associated with the target product.

15. The method of claim 11, wherein the providing at least the portion of the sensor data as input to at least one model from the plurality of models includes:
providing a first portion of the sensor data to a first model from the plurality of models configured to generate an output predicting at least one characteristic associated with the target product; and
providing a second portion of the sensor data to a second model from the plurality of models configured to generate an output predicting at least one characteristic associated with the deployment.

16. The method of claim 11, wherein the body of water is an ocean, the providing at least the portion of the sensor data as input to at least one model from the plurality of models includes:
providing a first portion of the sensor data to a first model from the plurality of models configured to generate an output predicting at least one characteristic associated with the target product;
providing a second portion of the sensor data to a second model from the plurality of models configured to generate an output predicting at least one characteristic associated with the deployment; and
providing a third portion of the sensor data to a third model from the plurality of models configured to generate an output predicting at least one environmental characteristic associated with a portion of the ocean in which the deployment is deployed.

17. The method of claim 11, wherein the body of water is an ocean, the method further comprising:
predicting, based at least in part on the output of the last model from the plurality of models, a perturbation of at least one characteristic associated with a portion of the ocean in which the deployment is deployed.

18. The method of claim 11, wherein the deployment is a first deployment for cultivating a first target product, the method further comprising:
selecting, based on the predicted capacity of the first target product to sequester carbon dioxide, at least one characteristic associated with a second deployment for cultivating a second target product.

19. The method of claim 11, wherein the deployment includes a plurality of cultivation apparatus, the obtaining sensor data includes obtaining the sensor data from at least one sensor of a cultivation apparatus from the plurality of cultivation apparatus.

20. A method, comprising:
obtaining first sensor data from at least one sensor associated with a cultivation apparatus included in a deployment of a plurality of cultivation apparatus deployed in an ocean, the deployment configured to cultivate a target product for sequestering carbon dioxide;
obtaining second sensor data from at least one sensor associated with the deployment;
training a first model based at least in part on the first sensor data, the first model configured to predict at least one parameter associated with a growth of the target product of the cultivation apparatus;
training a second model based at least in part on the second sensor data, the second model configured to predict a geographic dispersion of the deployment in the ocean; and
executing a third model based at least in part on an output from each of the first model and the second model, the third model configured to predict an amount of accumulation of the target product of the deployment.

21. The method of claim 20, wherein the cultivation apparatus is a first cultivation apparatus, the training the first model includes iteratively training the first model based at least in part on a weighted comparison of the first sensor data and data associated with direct measurements of the target product of a second cultivation apparatus included in the deployment.

22. The method of claim 21, wherein the training the second model includes iteratively training the second model based at least in part on a weighted comparison of the second sensor data and data associated with at least one of the deployment or the ocean.

23. The method of claim 22, wherein the iteratively training the second model includes performing data smoothing of the second sensor data to reduce a dimensionality of the second sensor data.

24. The method of claim 20, wherein the deployment is a first deployment, the method further comprising:
obtaining third sensor data from at least one sensor associated with a first cultivation apparatus included in a second deployment of a plurality of cultivation apparatus deployed in the ocean, the second deployment configured to cultivate a target product for sequestering carbon dioxide;
executing the first model based at least in part on the third sensor data, an output of the first model associated with at least one characteristic of the target product for the first cultivation apparatus; and
executing a fourth model based on an aggregation of the output of the first model and data associated with direct measurements of the target product of a second cultivation apparatus included in the second deployment, an output of the fourth model predicting the at least one parameter associated with the growth of the target product of the plurality of cultivation apparatus included in the second deployment, an accuracy of the prediction resulting from the output of the fourth model being greater than an accuracy of a prediction based on the output of the first model.

25. The method of claim 24, further comprising:
obtaining fourth sensor data from at least one sensor associated with the second deployment;
executing the second model based at least in part on the fourth sensor data, and output of the second model associated with a geographic dispersion of the second deployment in the ocean; and
executing a fifth model based on an aggregation of the output of the second model and data associated with at least one of the second deployment or the ocean, an output of the fifth model predicting the geographic dispersion of the second deployment in the ocean, an accuracy of the prediction resulting from the fifth output being greater than an accuracy of a prediction based on the second output.

26. The method of claim 25, further comprising:
executing a sixth model based on an aggregation of satellite data associated with the ocean and environmental data associated with at least one cultivation apparatus in the second deployment, an output of the sixth model predicting at least one environmental characteristic associated with a portion of the ocean in which the second deployment is deployed.

27. The method of claim 26, further comprising:
executing a seventh model based on an aggregation of the outputs of each of the fifth model and the sixth model, an output of the seventh model predicting an amount of accumulation of the target product of the second deployment.

28. The method of claim 27, further comprising:
executing an eighth model based on an aggregation of the outputs of the fourth model and the seventh model, an output of the eighth model predicting a capacity of the target product of the second deployment to sequester carbon dioxide.

29. The method of claim 28, further comprising:
executing a ninth model based at least in part on an output of the eighth model, an output of the ninth model predicting an amount of certainty associated with an amount of carbon dioxide sequestered by the target product of the second deployment.

30. The method of claim 29, further comprising:
determining an amount of carbon dioxide offset credits associated with the amount of carbon dioxide sequestered by the target product of the second deployment.

* * * * *